US009380366B2

United States Patent
Kang et al.

(10) Patent No.: US 9,380,366 B2
(45) Date of Patent: Jun. 28, 2016

(54) SECURING STRUCTURE OF SOUND OUTPUT MECHANISM AND SOUND PROCESSING MEANS OF MOBILE DEVICE CAPABLE OF OUTPUTTING VISUAL AND SOUND SIGNALS

(75) Inventors: Yoon Kyu Kang, Gyeonggi-do (KR); Hyeon Cheol Park, Gyeonggi-do (KR)

(73) Assignee: YEIL ELECTRONICS CO., LTD., Incheon (KR)

( * ) Notice: Subject to any disclaimer, the term of this patent is extended or adjusted under 35 U.S.C. 154(b) by 0 days.

(21) Appl. No.: 14/349,261

(22) PCT Filed: Jun. 5, 2012

(86) PCT No.: PCT/KR2012/004443
§ 371 (c)(1),
(2), (4) Date: Apr. 2, 2014

(87) PCT Pub. No.: WO2013/069858
PCT Pub. Date: May 16, 2013

(65) Prior Publication Data
US 2014/0241564 A1    Aug. 28, 2014

(30) Foreign Application Priority Data

Nov. 9, 2011   (KR) .................. 10-2011-0116190
Dec. 2, 2011   (KR) .................. 10-2011-0128045
Apr. 30, 2012  (KR) .................. 10-2012-0045611

(51) Int. Cl.
*H04R 1/02*      (2006.01)
*H04B 1/3888*   (2015.01)
(Continued)

(52) U.S. Cl.
CPC .............. *H04R 1/025* (2013.01); *H04B 1/3888* (2013.01); *H04M 1/026* (2013.01); *H04M 1/03* (2013.01);
(Continued)

(58) Field of Classification Search
CPC ...... H04R 1/02; H04R 2499/11; H04R 1/028; H04R 1/025; H04R 7/045; H04R 9/06
USPC ........................................................ 381/386
See application file for complete search history.

(56) References Cited

U.S. PATENT DOCUMENTS 7,764,803 B2    7/2010  Kang
8,027,502 B2 *  9/2011  Mitobe et al. ................. 381/386
(Continued)

FOREIGN PATENT DOCUMENTS

CN          1764326         4/2006
CN          201327827      10/2009
(Continued)

OTHER PUBLICATIONS

Notice of Preliminary Rejection issued by the Korean Intellectual Property Office on Feb. 19, 2013.
(Continued)

*Primary Examiner* — Mark Blouin
(74) *Attorney, Agent, or Firm* — IP & T Group LLP

(57) ABSTRACT

A sound output mechanism of a mobile device capable of outputting visual and sound signals, for example, a smart phone, tablet PC, MP4 (including MP3) has an image output unit and a sound processing unit. The image output unit of the mobile device is arranged on the entire surface of a main body and the sound processing unit for outputting vibration power and sound is firmly secured at the inside thereof without increasing the volume or the area thereof.

16 Claims, 19 Drawing Sheets

(51) Int. Cl.
*H04M 1/02* (2006.01)
*H04M 1/03* (2006.01)
*H04R 1/24* (2006.01)
*H04R 7/04* (2006.01)
*H04R 9/06* (2006.01)

(52) U.S. Cl.
CPC .................. *H04R 1/24* (2013.01); *H04R 7/045* (2013.01); *H04M 1/0266* (2013.01); *H04R 9/066* (2013.01); *H04R 2201/003* (2013.01); *H04R 2440/05* (2013.01); *H04R 2499/11* (2013.01)

(56) References Cited

U.S. PATENT DOCUMENTS

| | | | | |
|---|---|---|---|---|
| 8,150,091 | B2 * | 4/2012 | Eaton et al. | 381/386 |
| 8,718,316 | B2 * | 5/2014 | Much et al. | 381/386 |
| 2012/0250928 | A1 * | 10/2012 | Pance et al. | 381/386 |
| 2013/0039526 | A1 * | 2/2013 | Inoue et al. | 381/386 |

FOREIGN PATENT DOCUMENTS

| | | |
|---|---|---|
| CN | 101983514 | 3/2011 |
| JP | 2564406 | 11/1997 |
| KR | 200279636 | 6/2002 |
| KR | 1020030057110 | 7/2003 |
| KR | 1020050044828 | 5/2005 |
| KR | 100842093 | 6/2008 |
| KR | 1020100040988 | 4/2010 |
| WO | WO 2009/133986 | 11/2009 |

OTHER PUBLICATIONS

Notice of Preliminary Rejection issued by the Korean Intellectual Property Office on Aug. 14, 2013.

Office Action issued by the State Intellectual Property Office of the People's Republic of China on Jan. 27, 2015.

* cited by examiner

Size of image output unit of conventional mobile device

Size of image output unit of present invention (expanded from size of body that is the same as that of the conventional mobile device)

Size of image output unit of present invention (only size of body is reduced while size of image output unit is the same as size of conventional image output unit)

FIG. 13

VIBRATION CONVERSION DATA SHEET

| freq | mass | accel | F | r | PI | W | Pa | Pa/Pre | dB | SPL | sumdB |
|---|---|---|---|---|---|---|---|---|---|---|---|
| 60 | 0.001 | 1.24 | 0.001 | 0.0055 | 3.1416 | 1E-04 | 14.687 | 734364 | 117.32 | 127 | 127.444 |
| 61.5 | 0.001 | 1.56 | 0.002 | 0.0055 | 3.1416 | 1E-04 | 18.478 | 923877 | 119.31 | 127 | 127.683 |
| 63 | 0.001 | 2.1 | 0.002 | 0.0055 | 3.1416 | 1E-04 | 24.874 | 1E+06 | 121.89 | 127 | 128.168 |
| 65 | 0.001 | 3.01 | 0.003 | 0.0055 | 3.1416 | 1E-04 | 35.652 | 2E+06 | 125.02 | 126 | 128.548 |
| 67 | 0.001 | 3.42 | 0.004 | 0.0055 | 3.1416 | 1E-04 | 40.508 | 2E+06 | 126.13 | 126 | 129.076 |
| 69 | 0.001 | 3.54 | 0.004 | 0.0055 | 3.1416 | 1E-04 | 41.93 | 2E+06 | 126.43 | 126 | 129.231 |
| 71 | 0.001 | 3.83 | 0.004 | 0.0055 | 3.1416 | 1E-04 | 45.365 | 2E+06 | 127.11 | 126 | 129.603 |
| 73 | 0.001 | 3.98 | 0.005 | 0.0055 | 3.1416 | 1E-04 | 47.141 | 2E+06 | 127.45 | 126 | 129.794 |
| 75 | 0.001 | 4.17 | 0.005 | 0.0055 | 3.1416 | 1E-04 | 49.392 | 2E+06 | 127.85 | 126 | 130.035 |
| 77.5 | 0.001 | 4.47 | 0.005 | 0.0055 | 3.1416 | 1E-04 | 52.945 | 3E+06 | 128.46 | 126 | 130.41 |
| 80 | 0.001 | 5.13 | 0.006 | 0.0055 | 3.1416 | 1E-04 | 60.763 | 3E+06 | 129.65 | 125 | 130.932 |
| 82.5 | 0.001 | 6.31 | 0.007 | 0.0055 | 3.1416 | 1E-04 | 74.739 | 4E+06 | 131.45 | 125 | 132.337 |
| 85 | 0.001 | 7.58 | 0.009 | 0.0055 | 3.1416 | 1E-04 | 89.782 | 4E+06 | 133.04 | 124 | 133.563 |
| 87.5 | 0.001 | 8.98 | 0.01 | 0.0055 | 3.1416 | 1E-04 | 106.36 | 5E+06 | 134.52 | 123 | 134.811 |
| 90 | 0.001 | 10.5 | 0.012 | 0.0055 | 3.1416 | 1E-04 | 124.37 | 6E+06 | 135.87 | 123 | 136.092 |
| 92.5 | 0.001 | 11.4 | 0.013 | 0.0055 | 3.1416 | 1E-04 | 135.03 | 7E+06 | 136.59 | 122 | 136.736 |
| 95 | 0.001 | 12.7 | 0.014 | 0.0055 | 3.1416 | 1E-04 | 150.43 | 8E+06 | 137.53 | 122 | 137.646 |
| 97.5 | 0.001 | 13.2 | 0.015 | 0.0055 | 3.1416 | 1E-04 | 156.35 | 8E+06 | 137.86 | 120 | 137.932 |
| 100 | 0.001 | 9.38 | 0.011 | 0.0055 | 3.1416 | 1E-04 | 111.1 | 6E+06 | 134.89 | 120 | 135.032 |
| 103 | 0.001 | 7.18 | 0.008 | 0.0055 | 3.1416 | 1E-04 | 85.044 | 4E+06 | 132.57 | 125 | 133.272 |
| 106 | 0.001 | 5.71 | 0.007 | 0.0055 | 3.1416 | 1E-04 | 67.633 | 3E+06 | 130.58 | 125 | 131.643 |
| 109 | 0.001 | 4.72 | 0.005 | 0.0055 | 3.1416 | 1E-04 | 55.906 | 3E+06 | 128.93 | 125 | 130.404 |
| 112 | 0.001 | 4.03 | 0.005 | 0.0055 | 3.1416 | 1E-04 | 47.734 | 2E+06 | 127.56 | 125 | 129.474 |
| 115 | 0.001 | 3.53 | 0.004 | 0.0055 | 3.1416 | 1E-04 | 41.811 | 2E+06 | 126.41 | 125 | 128.77 |
| 118 | 0.001 | 3.16 | 0.004 | 0.0055 | 3.1416 | 1E-04 | 37.429 | 2E+06 | 125.44 | 125 | 128.238 |
| 122 | 0.001 | 2.7 | 0.003 | 0.0055 | 3.1416 | 1E-04 | 31.98 | 2E+06 | 124.08 | 125 | 127.573 |
| 125 | 0.001 | 2.45 | 0.003 | 0.0055 | 3.1416 | 1E-04 | 29.019 | 1E+06 | 123.23 | 125 | 127.216 |
| 128 | 0.001 | 2.26 | 0.003 | 0.0055 | 3.1416 | 1E-04 | 26.769 | 1E+06 | 122.53 | 125 | 126.949 |
| 132 | 0.001 | 2.32 | 0.003 | 0.0055 | 3.1416 | 1E-04 | 27.479 | 1E+06 | 122.76 | 125 | 127.033 |
| 136 | 0.001 | 2.42 | 0.003 | 0.0055 | 3.1416 | 1E-04 | 28.664 | 1E+06 | 123.13 | 125 | 127.174 |
| 140 | 0.001 | 2.24 | 0.003 | 0.0055 | 3.1416 | 1E-04 | 26.532 | 1E+06 | 122.45 | 125 | 126.922 |
| 145 | 0.001 | 2 | 0.002 | 0.0055 | 3.1416 | 1E-04 | 23.689 | 1E+06 | 121.47 | 125 | 126.595 |
| 150 | 0.001 | 1.84 | 0.002 | 0.0055 | 3.1416 | 1E-04 | 21.794 | 1E+06 | 120.75 | 125 | 126.385 |

No. 1 Sounds by vibrations of panel (Sounds that can protect privacy)
No. 2 Panel plus vibration reinforced sounds = Actual sounds
      (Target sound characteristics)

SECURING STRUCTURE OF SOUND OUTPUT MECHANISM AND SOUND PROCESSING MEANS OF MOBILE DEVICE CAPABLE OF OUTPUTTING VISUAL AND SOUND SIGNALS

This application is a national stage application of PCT/KR2012/004443 filed on Jun. 5, 2012, which claims priority of Korean patent application number 10-2011-0116190, Korean patent application number 10-2011-0128045, and Korean patent application number 10-2012-0045611, filed on Nov. 9, 2011, Dec. 2, 2011, and Apr. 30, 2012, respectively. The disclosure of each of the foregoing applications is incorporated herein by reference in its entirety.

TECHNICAL FIELD

The present invention relates to a sound output mechanism of a mobile device that can output visual and sound signals, and more particularly to a mobile device such as a smart phone, a tablet PC, and an MP4 player (including an MP3 player) (in particular, a smart phone that performs one-to-one communications while securing the privacy of an individual) having an image output unit and a sound processing unit, a sound output mechanism of a mobile device that can output visual and sound signals in which an image output unit of the mobile device is disposed on an entire front surface of a body of the mobile device and a sound processing unit for outputting vibrating forces and sounds is firmly fixed to an inner surface of the mobile device without increasing the volume or the area of the mobile device, and a fixing structure of a sound processing unit.

BACKGROUND ART

In general, examples of mobile devices that can output visual and sound signals include smart phones, tablet PCs, and MP4 players (including MP3 players).

A smart phone refers to a complex wireless communication device in which advantages of a mobile phone and a personal digital assistant (PDA) are combined. A PDA function is generally added to the function of a mobile phone in the smart phone, by which interconnection of PCs, management of personal information, wireless Internet, transmission and reception of faxes as well as voice communications may be supported. The smart phone supports both keypad and electronic pen input methods so that letters can be input more conveniently, a large capacity memory can be employed as compared with a mobile phone, various programs and data can be used due to an operating system thereof, and programs can be constantly added or deleted.

Meanwhile, a table PC is a new concept product in which a portability of a PDA and the function of a laptop computer are combined and has a touch screen therein, so that programs can be executed by using a pen. The tablet PC having a function of directly recognizing the letters written by a user and storing the letters as data allows a user to use the wireless Internet while having the function of a desktop computer. Further, since the tablet PC uses the Microsoft Office program which an application used in general PCs, a beginner can use the tablet PC without difficulty.

Meanwhile, the tablet PC is a player device that supports a file format defined as part 14 of MPEG-4 which is the standard of video compression encryption of ISO/IEC JTC 1.

The mobile device (hereinafter, a mobile device includes a smart phone, a tablet PC, and an MP4 player and in particular, refers to a smart phone) includes a screen (OLED unit) for outputting images such as videos, images, and letters (numbers) and a receiver (speaker) for outputting sounds such as such as voices, and a microphone for inputting sounds is provided in a smart phone and a tablet PC.

In a description of an external structure of the mobile device, in general, as shown in FIG. 1, a predetermined area for a sound processing unit, that is, areas for a sound output unit 3 and a sound input unit 4 are secured at upper and lower ends of a front surface of the body 1, respectively, and an image output unit 2 is disposed at an intermediate portion thereof.

Since the conventional mobile device should secure areas corresponding to 10% to 15% of upper and lower ends of the front surface of the body 1 for the sound output unit 3 (also including a camera module in addition) and the sound input unit 4 (also including a simple input unit in addition), respectively, only a maximum of 70% to 80% of the front surface of the body 1 can be secured for the image output unit 2.

Further, since demand calls for a large sized image output unit 2, the area for the image output unit 2 must be enlarged thereby also enlarging the body 1 and therefore increasing the size of the mobile device.

Furthermore, the sound input/output unit of the conventional mobile device is coupled by a double-sided bonding unit having a cushion function. However, in the conventional coupling structure, a bonding force may be lowered according to a change in an internal temperature condition of the mobile device or the sound input/output unit may be separated from a fixed object as the bonding force becomes weak.

In addition, in the coupling structure of the sound processing unit of the conventional mobile device, a screw passes through a screw fixing member protruding to the outside of the case to be coupled to a portion that is to be fixed. However, the conventional coupling structure directly increases a volume or an area of the sound processing unit, increasing the size of the mobile device which has a limit in space.

DETAILED DESCRIPTION OF THE INVENTION

Technical Problem

The present invention provides a mobile device, such as a smart phone, a tablet PC, and an MP4 player (including an MP3 player), having an image output unit and a sound processing unit, a sound output mechanism of a mobile device that can output visual and sound signals in which an image output unit of the mobile device is disposed on an entire front surface of a body of the mobile device and a sound processing unit for outputting vibrating forces and sounds is firmly fixed to an inner surface of the mobile device without increasing a volume or an area of the mobile device and is firmly fixed easily through a simple coupling structure, and a fixing structure of a sound processing unit.

Technical Solution

In accordance with an aspect of the present invention, there is provided a sound output mechanism, wherein an image output unit (11) of a mobile device (10) having the image output unit (11) and a sound processing unit (12) is disposed on an entire front surface of a body (1) of the mobile device (10) and the sound processing unit (12) for outputting sounds while vibrating at a general frequency band and outputting a sound while vibrating at a high/low band at the same time or converting a collected voice wavelength into an electrical signal is disposed on an inner surface of the body (1) of the mobile device (10) such that a sound output from the sound processing unit (12) is transferred and output to the image output unit (11) or the image output unit (11) collects a voice wavelength and provides the voice wavelength to the sound processing unit (12) to convert the voice wavelength into an electrical signal.

In accordance with another aspect of the present invention, there is provided a sound processing unit fixing structure, wherein a base fixing unit (18) one end of which is fixed to a fixed object (11') and an opposite end of which passes through and inserted into one surface of a sound processing unit (12) for converting an electrical signal into sounds or vibration signals or converting a collected sound wavelength into an electrical signal is provided, and a fixing unit (16) for attaching and fixing the sound processing unit (12) to the fixed object (11') while passing through an opposite surface of the sound processing unit (12) to be coupled to the base fixing unit (18) is provided.

Advantageous Effects

According to the present invention, an image output unit of a mobile device is disposed on an entire front surface of a body of the mobile device and a sound processing unit that outputs and transfers vibrating forces and sounds or receives sounds surface-contacts a rear portion of the mobile device, so that an output screen of the image output unit can be maximally secured and a sound signal whose sound pressure is improved is transferred and output to the entire image output unit as vibrations and sounds output from a weight body vibrating part and a vibration plate vibrating part of the sound processing unit are added.

Further, according to the present invention, the visibility of an image output through the image output unit can be improved by maximally securing an output screen of the image output unit. Further, according to the present invention, sounds and vibrations output from the sound processing unit are transferred and output to the entire image output unit, so that high and low sound bands as well as a general frequency band can be covered.

Furthermore, according to the present invention, since the sound processing unit is fixedly pressed on a fixed object through a fixing unit provided in a case of the sound processing unit, the sound processing unit can be fixed without securing a thickness or an area. Accordingly, the sound processing unit can take up as little space as possible.

In addition, according to the present invention, since the sound processing unit 12 can be fixed to the image output unit 11 through forward/backward rotation of the fixing unit 16 by 90 degrees, the sound processing unit 12 can be easily assembled and disassembled.

BRIEF DESCRIPTION OF THE DRAWINGS

FIG. 13 is a vibration conversion data sheet;

MODE FOR CARRYING OUT THE INVENTION

Figure 1:
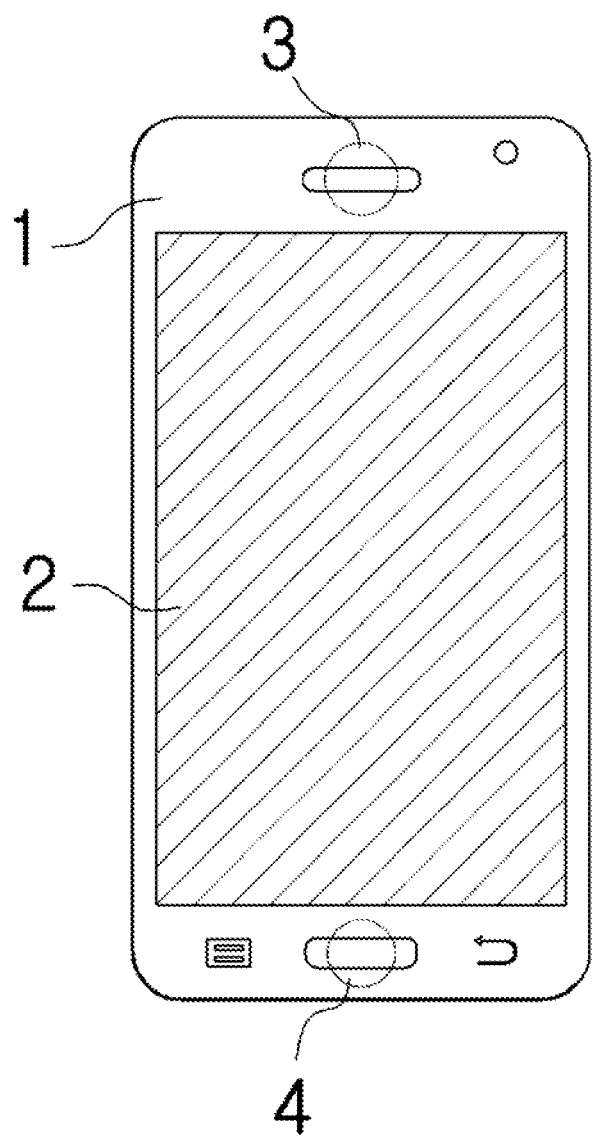
FIG. 1 is a front view schematically showing an external structure of a conventional mobile device.
Figure 2:
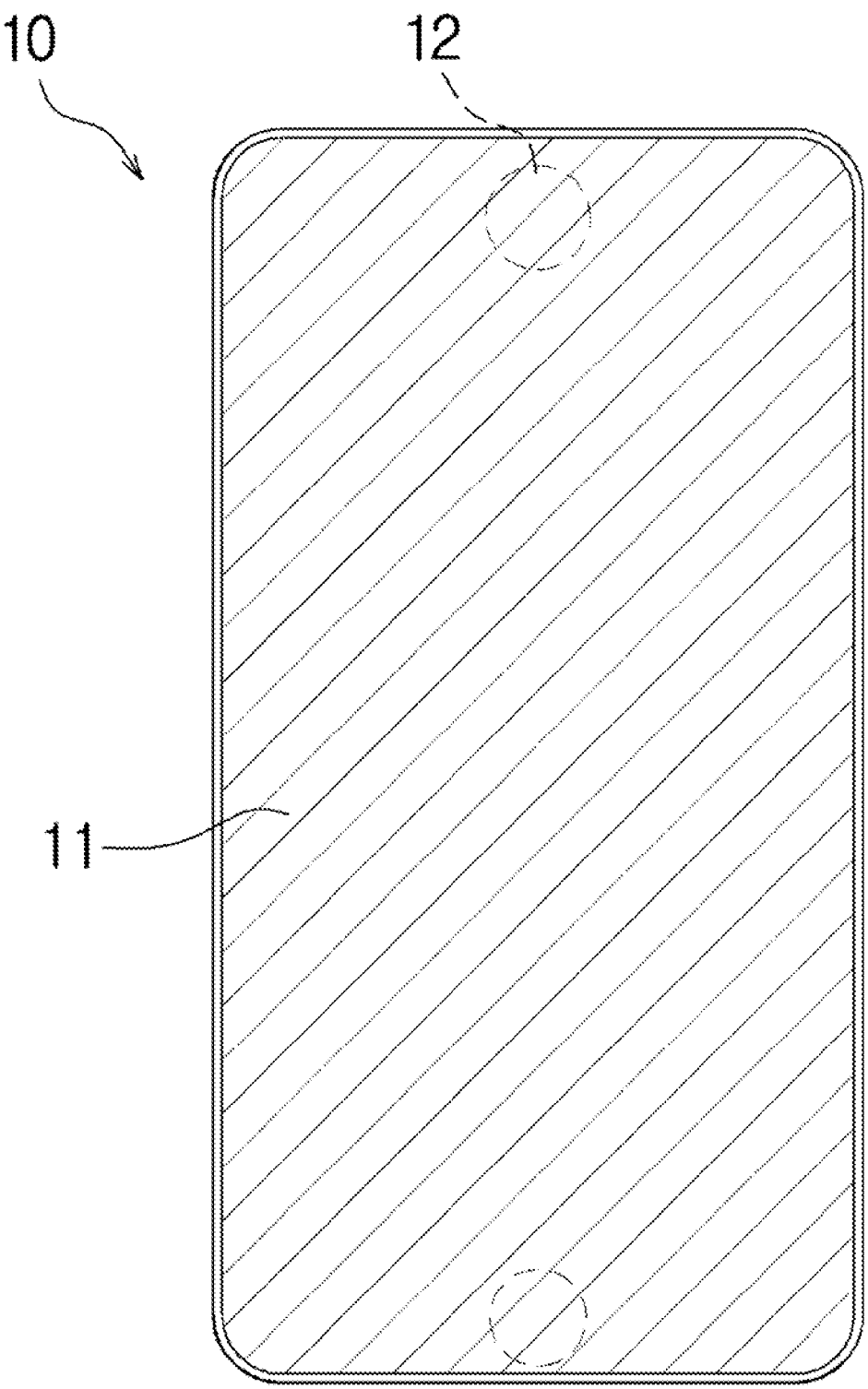
FIG. 2 is a front view schematically showing an external structure of a mobile device according to an embodiment of the present invention.
Figure 3:
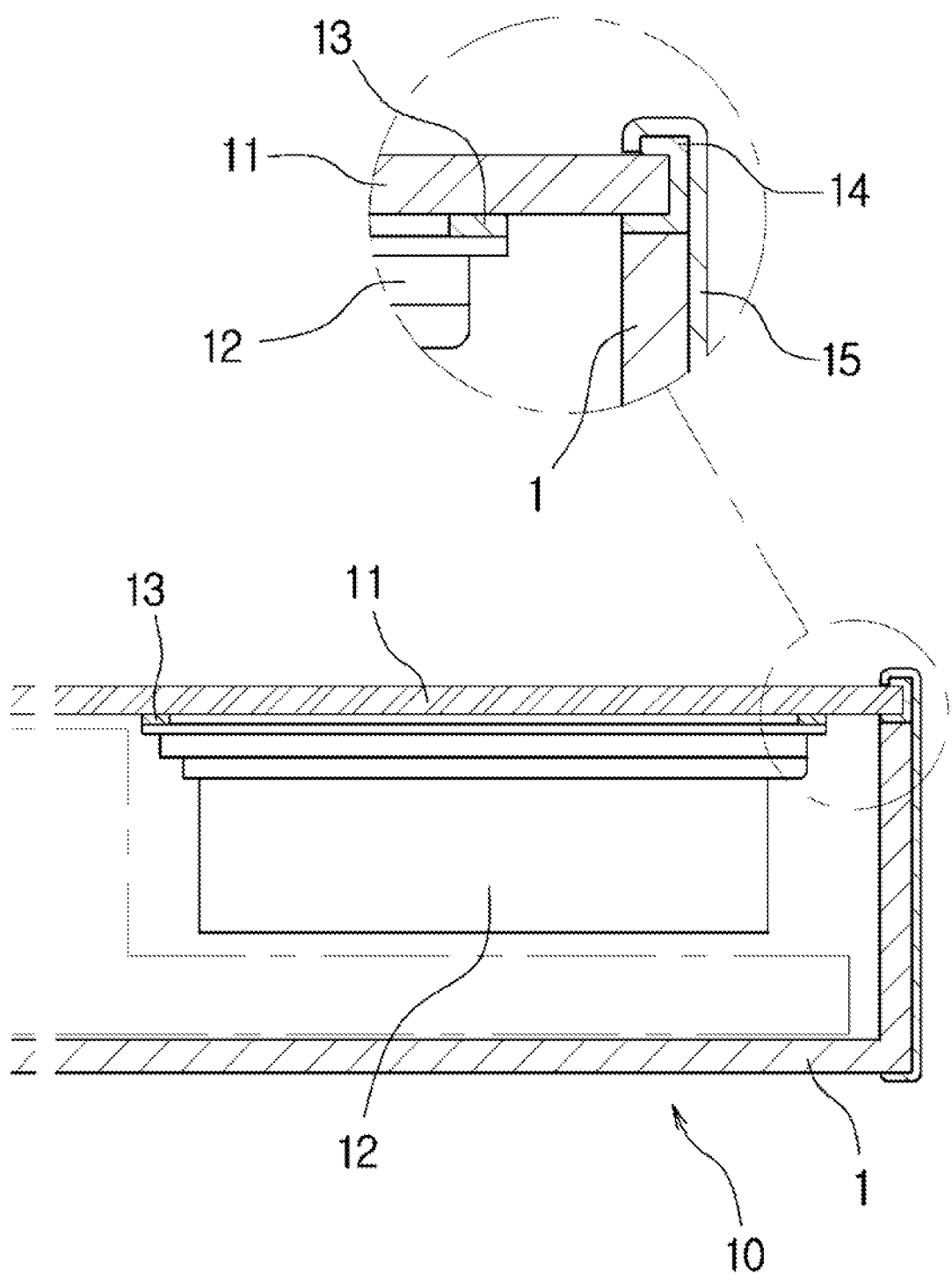
FIG. 3 is a sectional view showing a coupled state of an image output unit and a sound processing unit according to the embodiment of the present invention.
Figure 4:
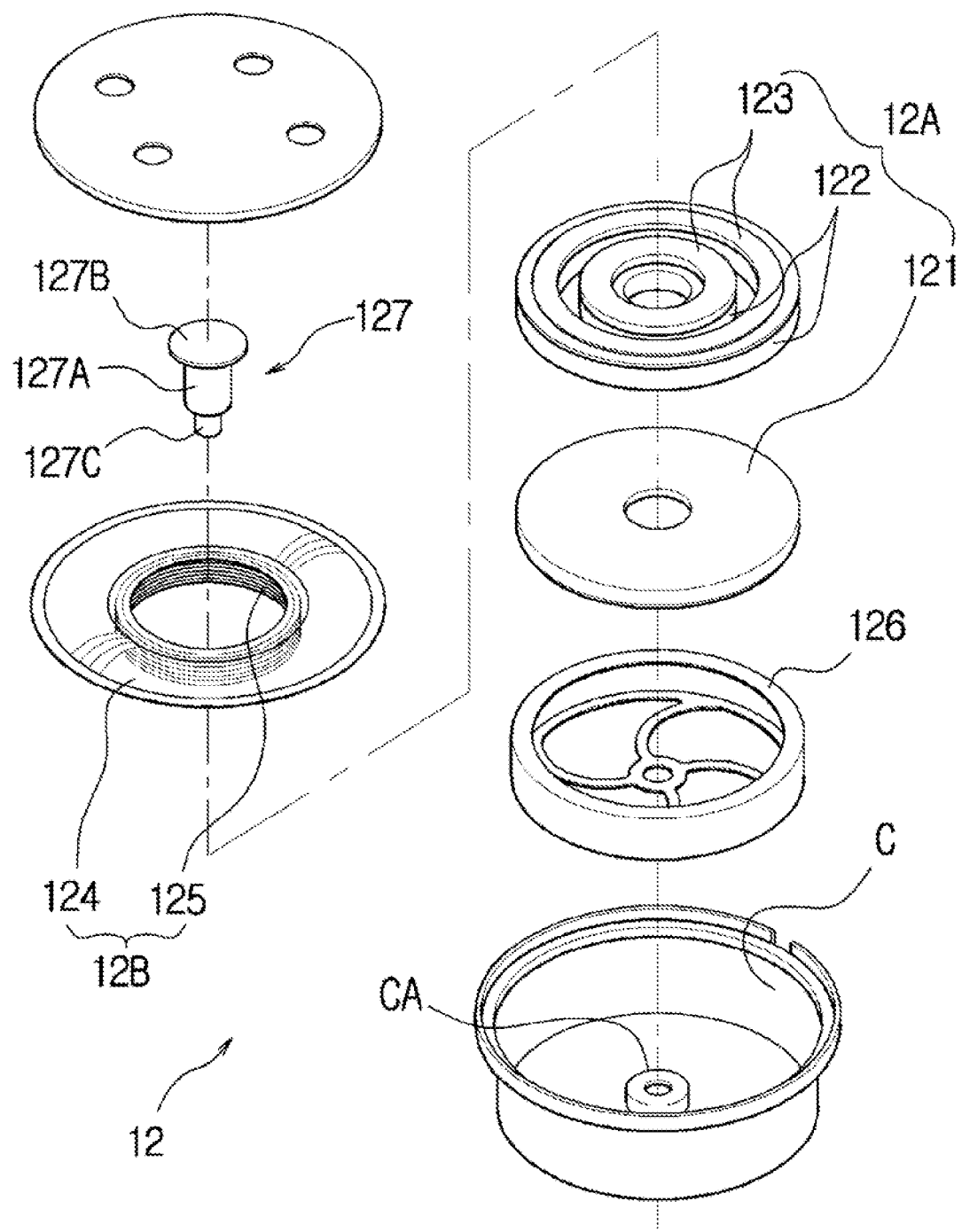
FIG. 4 is an exploded perspective view showing a structure of the sound processing unit according to the embodiment of the present invention in detail.
Figure 5:
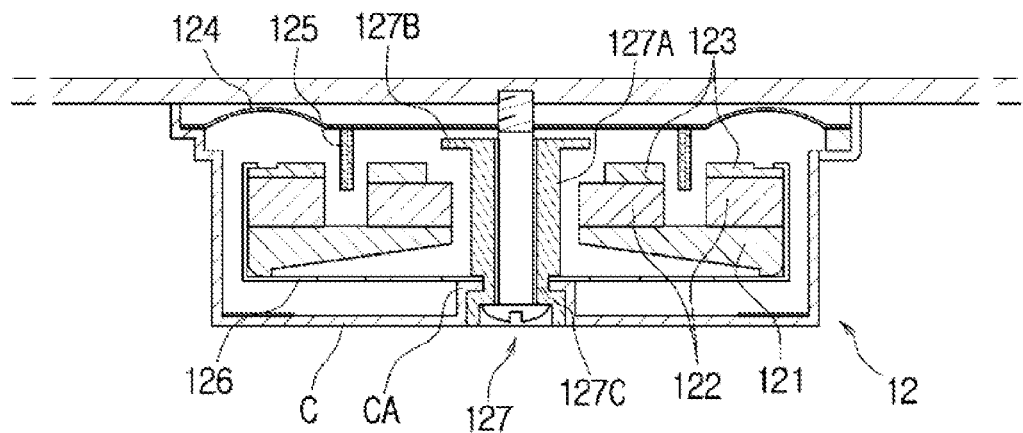
FIG. 5 is a sectional view showing the structure of the sound processing unit according to the embodiment of the present invention in detail.

Hereinafter, configurations of the present invention will be described in detail with reference to the accompanying drawings.

First, as shown in FIGS. 2 to 5, an image output unit 11 of a mobile device 10 having the image output unit 11 and a sound processing unit 12 is disposed on an entire front surface of a body 1 of the mobile device 10 and the sound processing unit 12 for outputting a sound while vibrating at a general frequency band and outputting a sound while vibrating at a high/low frequency band at the same time or converting a collected voice wavelength into an electrical signal is disposed on an inner surface of the body 1 of the mobile device 10 such that a sound output from the sound processing unit 12 is transferred and output to the image output unit 11 or the image output unit 11 collects a voice wavelength and provides the voice wavelength to the sound processing unit 12 to convert the voice wavelength into an electrical signal.

Here, the mobile device 10 according to the present invention may be any device having an image output unit 11 and a sound processing unit 12, such as a smart phone, a tablet PC, or an MP4 player (including an MP3 player). In particular, the mobile device 10 may be a smart phone that enables one-to-one communications while securing the privacy of an individual.

Meanwhile, the image output unit 11 according to the present invention is an image output panel, to which an organic light emitting diode (OLED) is applied. A periphery of the image output unit 11 may be surrounded by a resilient body 14 such as a gasket and may be fixed to a peripheral portion of a front surface of the body 1 of the mobile device 10. The resilient body 14 of the image output unit 11 and a peripheral portion of the body 1 may be finished through a molding member 15 that forms a separate periphery.

In this way, when the coupled or fixed portion of the mobile device 10 is formed of a resilient material, it can be expected that vibrations are transferred naturally and noise can be prevented.

Then, the resilient body 14 may be an electronic wave shielding gasket for preventing introduction or discharge of electronic waves or a metallic finger strip. When the resilient body 14 has an electronic wave shielding function, the material of the resilient body 14 may include aluminum (including an aluminum alloy), beryllium, copper, stainless steel or phosphor bronze but any material that forms a conductive wall between electronic wave generating sources to shield electronic waves, forms a conductive path to shield electronic waves, or radiates electronic waves to the ground is sufficient.

Meanwhile, the sound processing unit 12 according to the present invention may include a yoke 121; a magnet 122 and a top plate 123 positioned on the yoke 121 and having a ring shape; a coil 125 fixed to one surface of a vibration plate 124 fixed to an opened end of a box-shaped case C and located in apertures at peripheral portions of the magnet 122 and the top plate 123; a plate spring 126 fixed to an inner bottom surface of the case C by a rivet pin 127, for resiliently supporting the yoke 121, the magnet 122, and the top plate 123; and a fixing unit 16 for attaching and fixing the sound processing unit 12 to the image output unit 11 while passing through the rivet pin 127.

Then, portions of the yoke 121, the magnet 122, and the top plate 123 that resiliently vibrate while being supported by the plate spring 126 may correspond to a weight body vibrating part 12A, and portions of the vibration plate 124 and the coil 125 may correspond to a vibration plate vibrating part 12B. In this way, the present invention divides a vibration structure into two parts such that the weight body vibrating part 12A is responsible for vibrations at a general frequency band and the vibration plate vibrating part 12B is responsible for vibrations at high/low frequency bands as compared with the weight body vibrating part 12A.

An annular step may be formed on an inner peripheral surface or an outer peripheral surface of the yoke 121, an aperture may be formed between the magnet 122 and the top plate 123 positioned while maintaining a separation from the annular step, and a pair of magnets and top plates formed of a plate body, the center of which is hollow and being concentric to have different diameters, are positioned such that apertures may be formed between the magnets and the top plates. When apertures are formed between the annular step of the yoke 121, and the magnet 122 and the top plate 123, the structure thereof is simple and easy to be assembled. When a pair of magnets and top plates having different diameters is positioned on the yoke to form an aperture, the structure thereof is complex but the weight thereof is so heavy as to improve low sound characteristics. Thus, the latter case will be illustrated and described below.

The yoke 121 may be a block in which a surface of the block opposite to a surface on which the magnet 122 is positioned is declined downwards as it goes from the center to the edge thereof and an annular step is formed at a declined end of the edge thereof. In this way, the annular step of the yoke 121 is positioned on the plate spring 126, so that an inward portion of the yoke 121 moves like a wing when the yoke 121 resiliently vibrates vertically to prevent interference with the plate spring 126.

One surface of the coil 125 may be bonded and fixed to a central portion of one surface (an inner surface with respect to the case) of the vibration plate 124 an outer peripheral surface of which is fixed to an inside of an opened outer periphery of the case C, and one surface of the coil 125 may be bonded and fixed to a central portion of one surface (an inner surface with respect to the case) of a cover (not shown) inserted into an opened outer peripheral surface of the case C to interrupt the case C from the outside.

The plate spring 126 is a plate body having a resilient arm. The center of the plate spring 126 is hollow and the plate spring 126 is fixedly riveted to the case C by the rivet pin 127 and an outer periphery of the plate spring 126 is bent upwards to surround the outer peripheral surfaces of the yoke 121, the magnet 122, and the top plate 123 to be curled (bent, pressed, and coupled).

The rivet pin 127 may include a rivet pin body 127A having a hollow cylindrical shape; a stopper 127B formed at one end of the rivet pin body 127A to have a diameter larger than that of the rivet pin body 127A; and a rivet boss 127C formed at an opposite end of the rivet pin body 127A to have a diameter larger than that of the rivet pin body 127A. Then, the stopper 127B may be located between the magnet 122/the top plate 123 and the vibration plate 124. The step that is a border of the rivet pin body 127A and the rivet boss 127C fixes a central portion of the plate spring 16 positioned on the step CA of the case C through a rivet.

The rivet boss 127C passes through the through-hole of the plate spring 126 and the through-hole formed in the step CA of the case C to be fixedly riveted to a lower surface of the case C. Accordingly, even if the plate spring 126 is resiliently deformed to exceed an allowable resiliency value without overcoming the weight of the weight body vibrating part 12A including the yoke 121, the magnet 122, and the top plate 123, the stopper 1278 of the rivet pin 127 blocks the weight vibrating part 12A, preventing deformation of the plate spring 126.

A screw that is the above-described fixing unit 16 is inserted into the perforated central portion of the rivet pin 127 to be screw-coupled to the image output unit 11.

An operation of the present invention is as follows.

Figure 6:
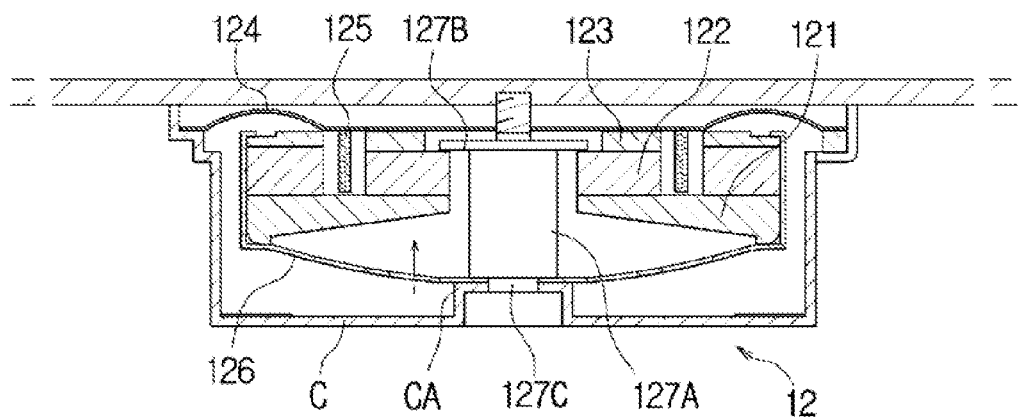
FIGS. 6 and 7 are sectional views showing vibration states at a general frequency band of the sound processing unit according to the present invention.
Figure 7:
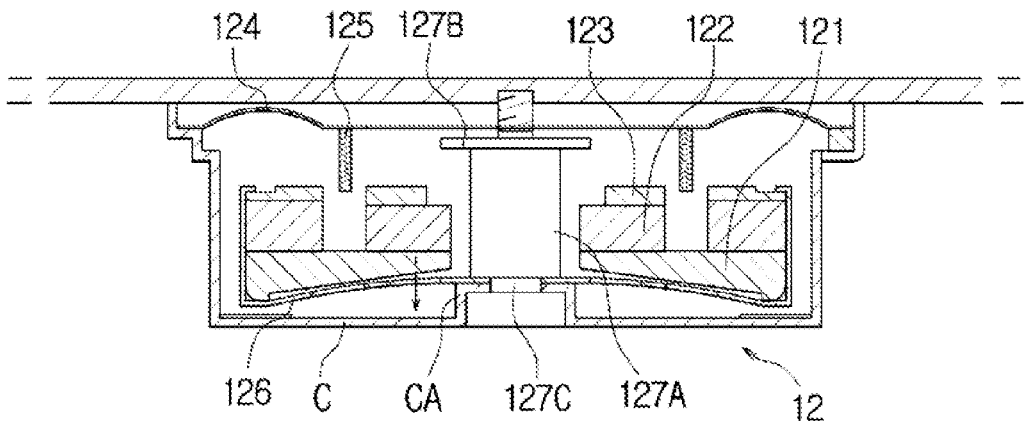
Figure 8:
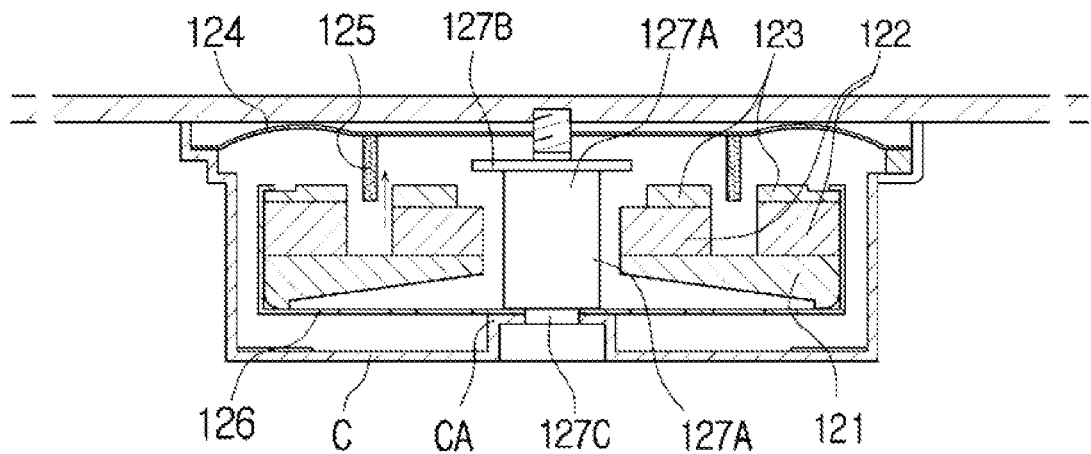
FIGS. 8 and 9 are sectional views showing vibration state at high/low frequency bands of the sound processing unit according to the present invention.
Figure 9:
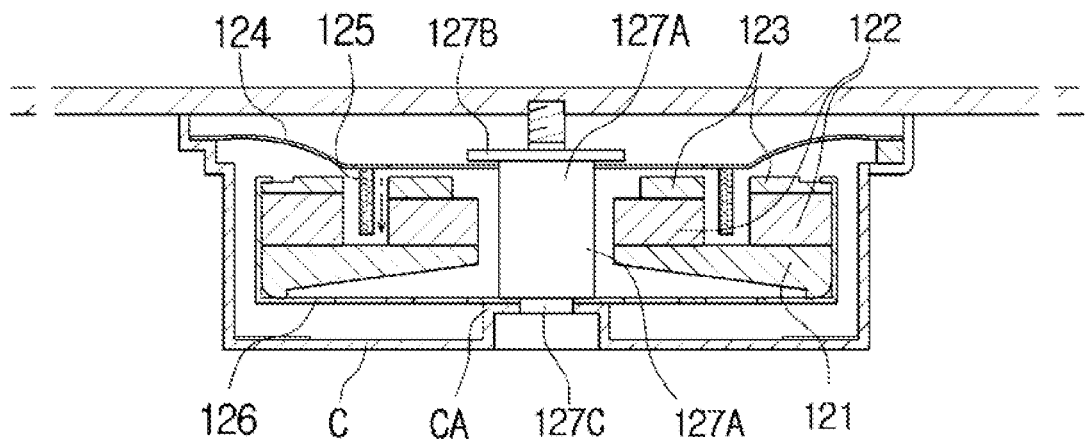

First, according to the present invention, the coil 125 fixed to a surface of the vibration plate 124 is located in the aperture between the pair of magnets 122 and top plates 123 positioned on the yoke 121, in which case the weight vibrating part 12A that is a magnetic circuit including the yoke 121, the magnet 122, and the top plate 123 reacts with a magnetic flux formed in the aperture according to a direction of an AC signal applied to the coil 125 to generate a vibrating force while vibrating as shown in FIGS. 6 and 7 and the vibration plate vibrating part 12B including the vibration plate 124 and the coil 125 also vibrates to generate a sound according to a frequency of the AC signal as shown in FIGS. 8 and 9.

Figure 10A:
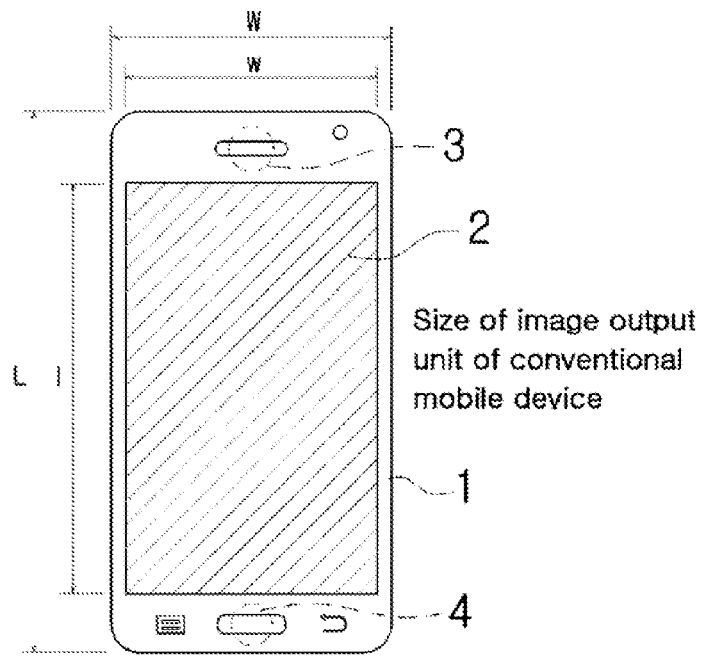
FIG. 10 is a view for comparing sizes of image output units of the conventional mobile device and the mobile device of the present invention.
Figure 10B:
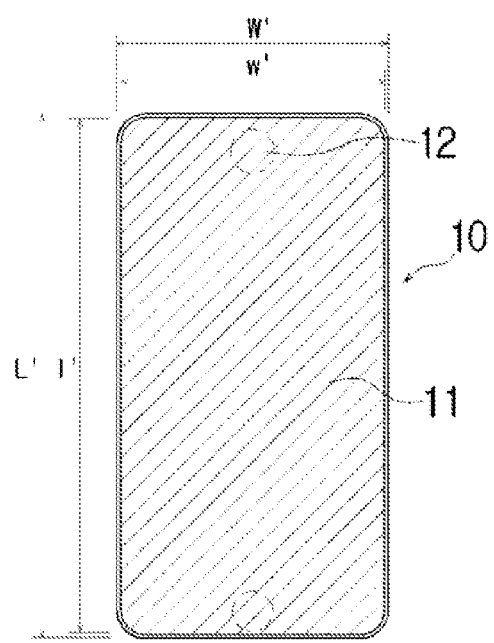
Figure 10C:
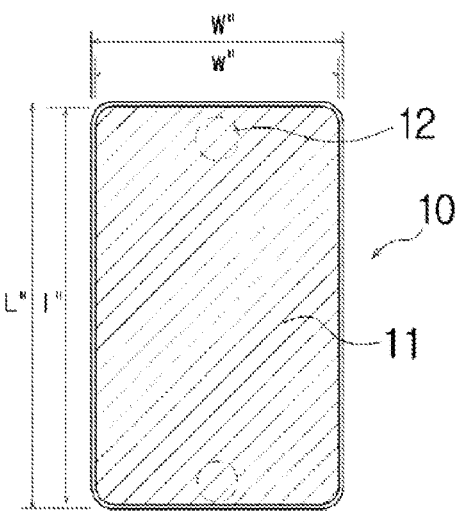

According to the present invention, as shown in FIG. 10, the image output unit 11 of the mobile device 10 is disposed on an entire front surface of the body 1 of the mobile device 10 and the sound processing unit 12 for outputting and transferring a vibrating force and a sound or receiving a sound surface-contacts a rear portion of the body 1 of the mobile device 10, so that an output screen of the image output unit 11 can be maximally secured as compared with the conventional mobile device and vibrations and a sound output from the weight body vibrating part 12A and the vibration plate vibrating part 12B of the sound processing unit 12 are added such that a sound signal whose sound pressure is improved is transferred and output to the entire image output unit 11.

That is, as shown, while an upper end and a lower end of the body 1 of the conventional mobile device occupy 10% to 15% of the area of the body 1, respectively as the sound input/output units 3 and 4 are located at the upper end and the lower end of the body 1 so that the image output unit 2 occupies as small as 70% to 80% of the area of the body 1, the area of the image output unit 11 of the present invention occupies most of the entire area of the body 1 of the mobile device 10.

As described above, according to the present invention, since an output screen of the image output unit 11 is maximally secured, a visibility of an image output through the image output unit 11 is improved. That is, when the width W' and the length L' of the mobile device 10 of the present invention are the same as the width W and the length L of the conventional mobile device, the width w' and the length l' of the image output unit 11 of the present invention become larger than the width w and the length l of the image output unit 2 of the conventional mobile device, increasing the area of the image output unit 11.

Further, according to the present invention, since the area of the body 1 of the mobile device 10 can be reduced while the area of the image output unit 11 is the same as the area of the image output unit 2 of the conventional mobile device, the size of the mobile device 10 can be significantly reduced. That is, the size of the body 1 can be reduced while the width w" and the length l" of the image output unit 11 of the present invention is the same as the width w and the length l of the image output unit 2 of the conventional mobile device.

Further, according to the present invention, since sounds and vibrations output from the sound processing unit 12 are transferred and output to the entire image output unit 11, both high and low sound bands can be covered.

According to the present invention, since the weight body vibrating part 12A is heavier than the vibration plate vibrating plate 12B, when an intensity of an input AC signal is weak, the weight vibrating part 12A, that is, the yoke 121, the magnet 122, and the top plate 123 do not vibrate but the vibration plate vibrating part 12B including the vibration plate 124 and the coil 125 vibrates. In contrast, when an intensity of an input AC signal is strong, that is, when the intensity of an input AC signal corresponds to an intensity by which the weight of the weight body vibrating part 12A can be overcome and vibrations can be generated, the weight body vibrating part 12A and the vibration plate vibrating part 12B vibrate at the same time, so that an sound is output through the vibrations and the output sound is transferred and output along the image output unit 11.

Figure 11:
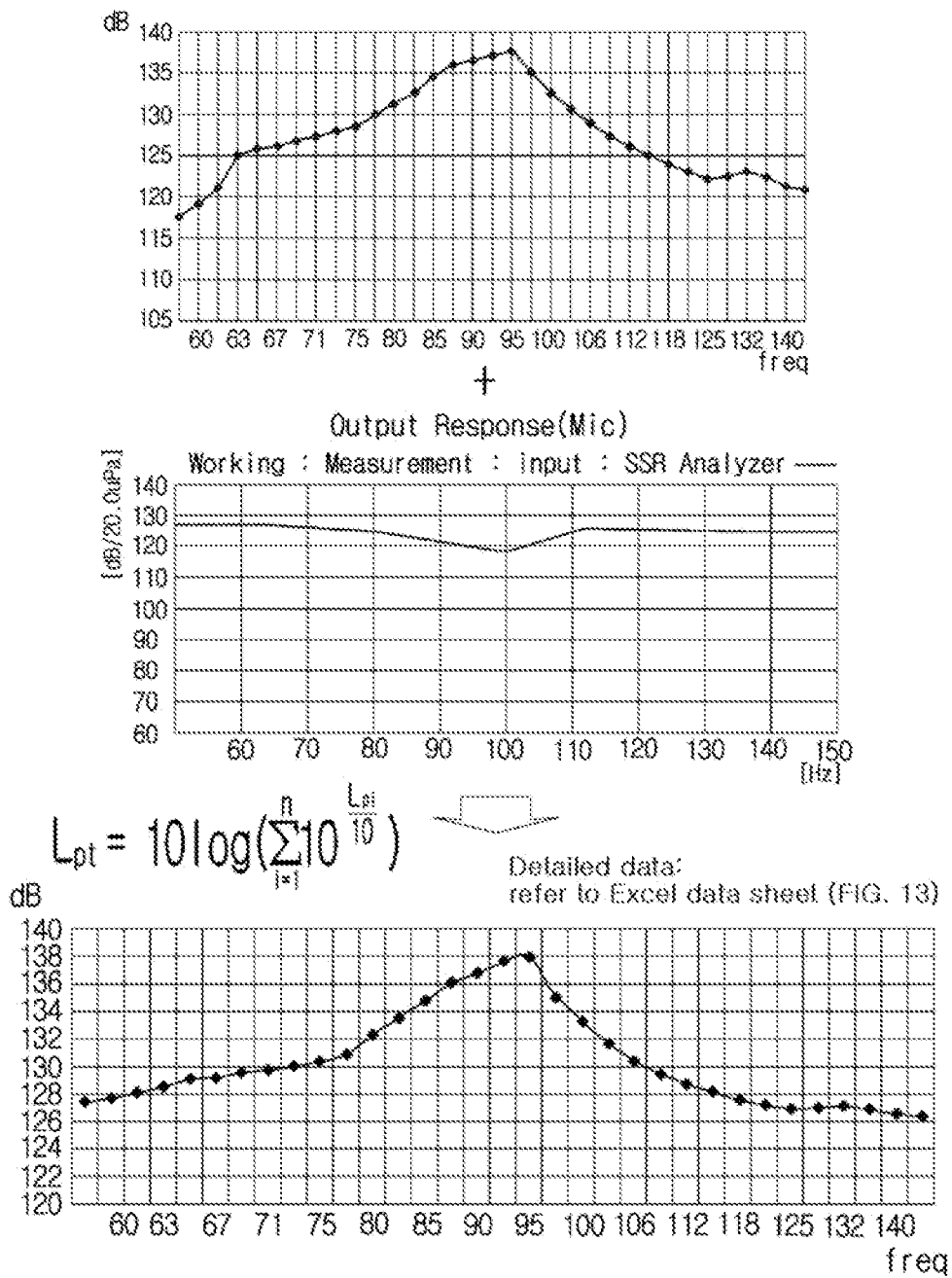
FIG. 11 is a graph showing a state in which vibrations at a high/low frequency band and vibrations at a general frequency band.

The graph related to output values of the weight body vibrating part 12A and the vibration plate vibrating part 12B corresponds to the graph shown at an upper side of FIG. 11*i* and the part obtained by adding the two output values is shown at a lower side of FIG. 11. That is, if the graph (the graph at the left side of an upper end of FIG. 11) of data obtained by converting a vibration signal output from the weight body vibrating part 12A and the graph (the graph at the right side of an upper end of FIG. 11) of data obtained by converting a sound signal output from the vibration plate vibrating part 12B, that is, actually output from the vibration plate 124 are added, a result as in the graph at a lower end of FIG. 11 is output.

Figure 12:
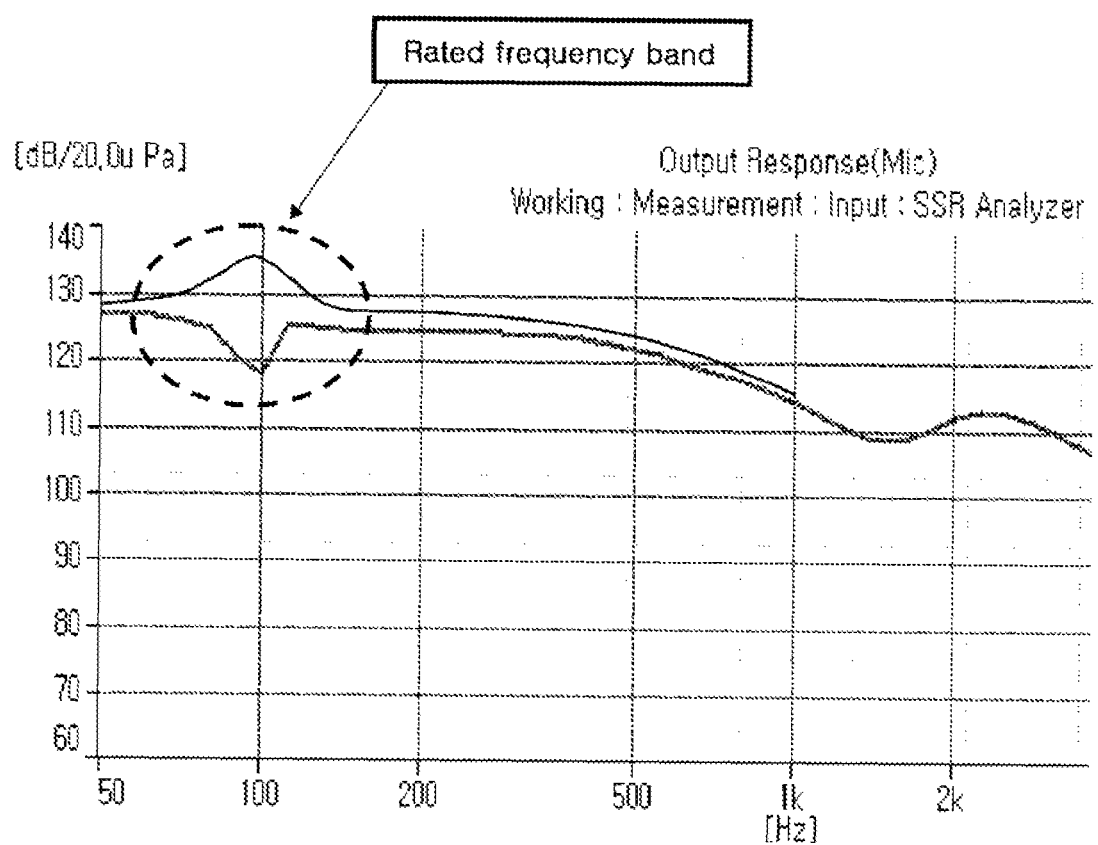
FIG. 12 is a graph showing a state in which the graph of FIG. 10 is actually measured.

The output values shown in the graph are actually close to ideal values as shown in FIG. 12. That is, the green graph of FIG. 12 corresponds to a signal output only from the vibration plate 124. When compared with the green graph of FIG. 12, it can be seen that the magnitude of a sound pressure of an output (the red graph of FIG. 12) obtained by adding signals output from the weight body vibrating part 12A and the vibration plate vibrating part 12B is improved.

Figure 14:
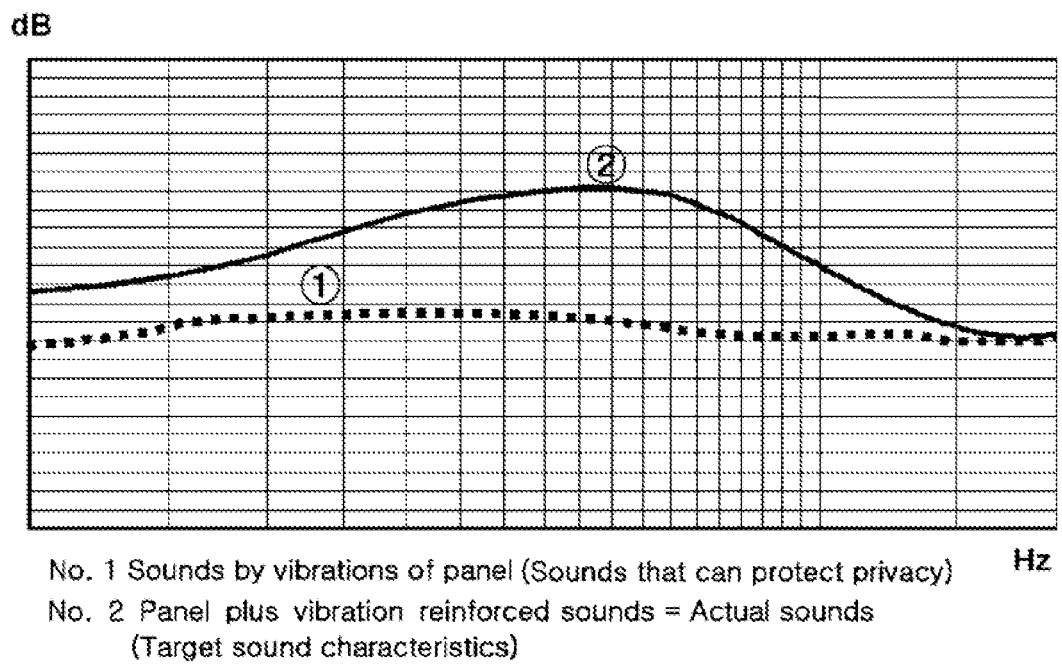
FIG. 14 is a graph showing a state in which a sound output by the sound processing unit is actually output by the image output unit.
Figure 15:
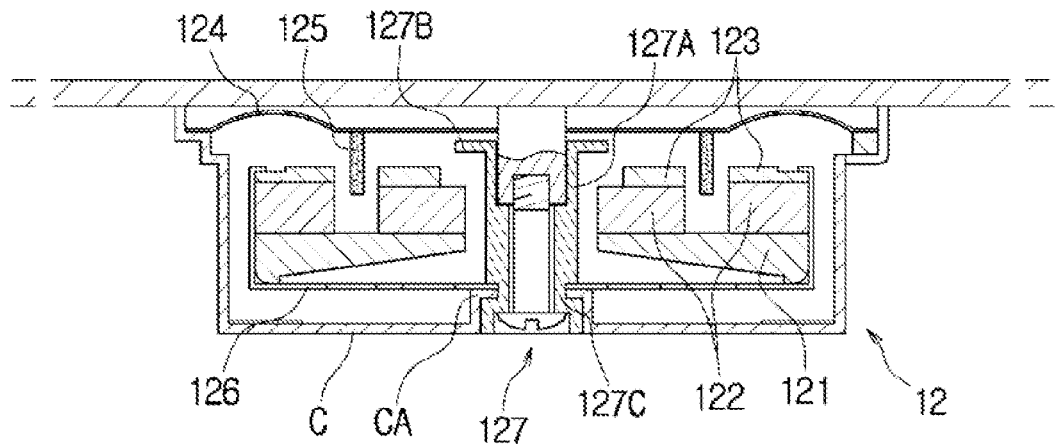
FIG. 15 is a sectional view showing another embodiment of the sound processing unit according to the present invention.

The result is shown in a vibration conversion data sheet of FIG. 13 in detail. That is, after experiments while changing conditions such as the weight, the radius, and the acceleration of the vibration part related part constituting the sound processing unit 12, a result similar to the result value graph could be obtained. As shown in FIG. 15, in graph No. 1 the vibrations of a panel are shown and in graph No. 2 (actual sound) a sound of a panel plus a vibration added sound is shown. Then, the green graph of FIG. 14 is a graph showing an SPL value of FIG. 13 and the red graph of FIG. 14 is a graph showing a sum dB of FIG. 13.

As shown in FIG. 15, in another example related to the coupling structure of the sound processing unit 12 to the image output unit 11 according to the present invention, a boss 18 is fixed to an inner surface of the image output unit 11 and the fixing unit 16 passing through the rivet pin 127 of the sound processing unit 12 is coupled to the boss 18 to fixedly press the image output unit 11 and the sound processing unit 12. Then, since the fixing unit 16 which is a screw is fixed through the boss 18 without damaging the image output unit 11, the output characteristics of the sound processing unit 12 as well as the output characteristics of the image output unit 11 can be prevented from being distorted.

Figure 16:
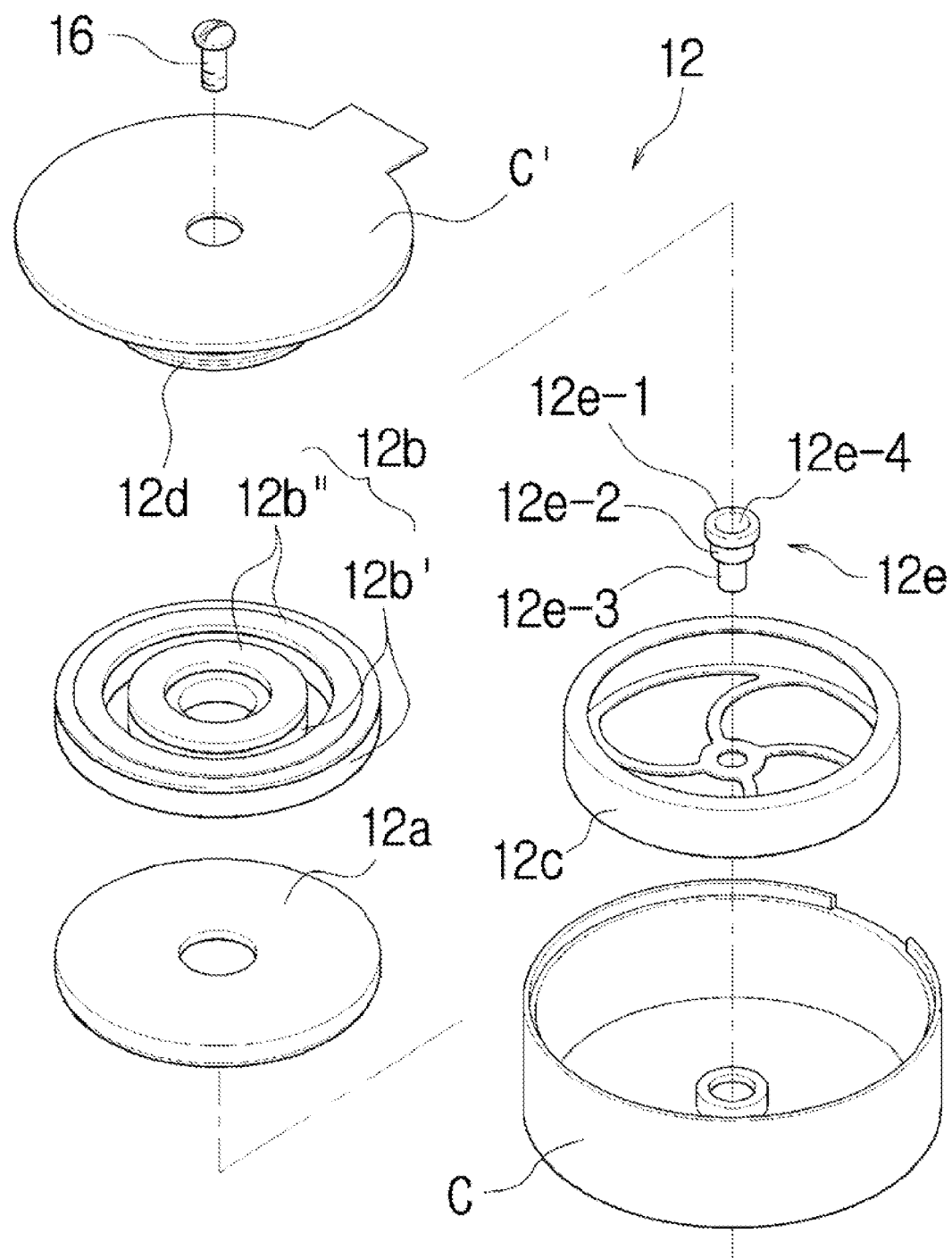
FIG. 16 is a sectional view showing another embodiment of the sound processing unit according to the present invention.
Figure 17:
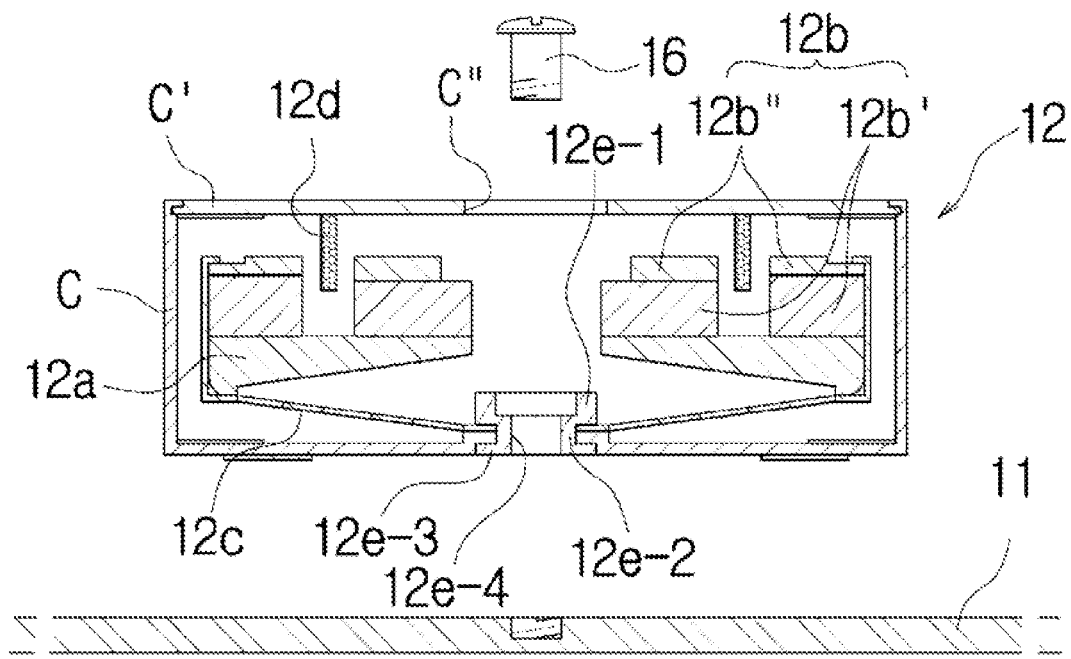
FIGS. 17 and 18 are sectional views showing another embodiment of the sound processing unit according to the present invention in more detail.
Figure 18:
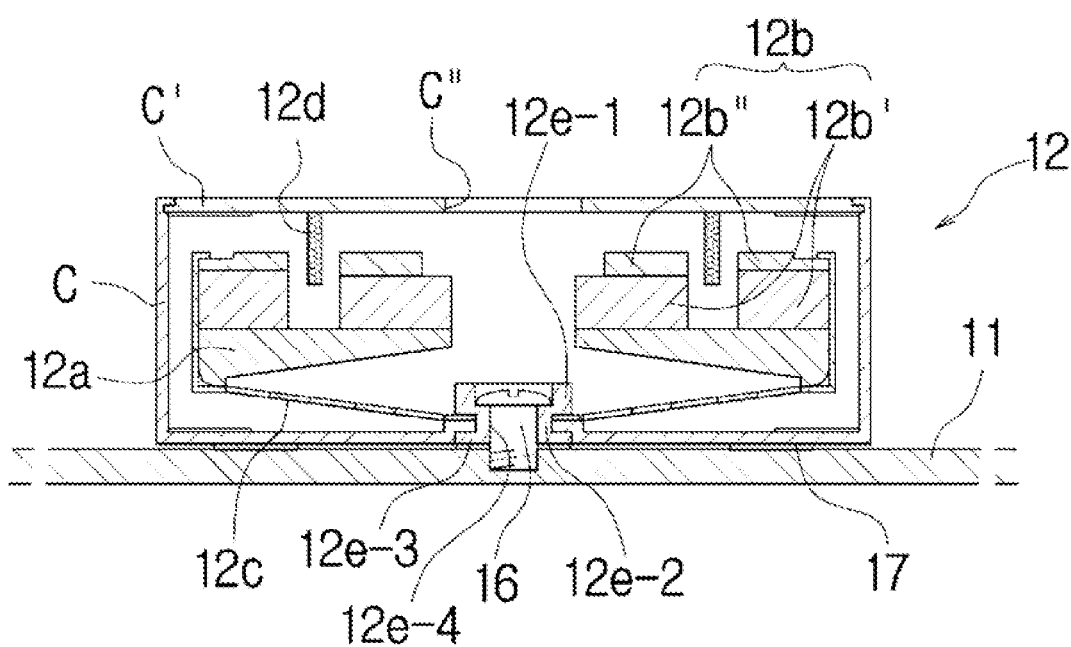

Another embodiment of the sound processing unit 12 according to the present invention will be described with reference to FIGS. 16 to 18.

The sound processing unit 12 may include a weight body 12a corresponding to a circular block having a perforated center portion; two sets of magnet stack bodies 12b concentrically provided on an upper surface of the weight body 12a to have an aperture (separation) and corresponding to a rim type for forming a magnetic flux; a plate spring 12c fixed to the case C by the rivet pin 12e to resiliently support the inner bottom surface of the case C while the weight body 12a and the magnet stack body 12b are constrained; and a coil 12d provided in the cover C' of the case C to be located in the aperture, for providing an alternating electrical signal input from an external signal source to generate vibrations through a reaction with the magnetic flux in the aperture.

The weight body 12a is a yoke and may be a block formed of tungsten.

The magnet stack body 12b may be obtained by stacking the top plate 12b" for concentrating a magnetic force to a predetermined side on one surface (an upper surface) of the rim type magnet 12b' for generating a magnetic force.

The plate spring 12c may be configured such that a plurality of resilient arms that are inclined upwards as it goes from a riveted central portion toward the edge thereof and a vertical bent portion thereof connecting ends of the resilient arms in a ring form surround the weight body 12a and the magnet stack body 12b to fixedly press the weight body 12a and the magnet stack body 12b. The rivet pin 12e may pass through the central portion of the plate spring 12c, which is fixedly coupled to the case C through the rivet.

The rivet pin 12e may include a head 12e-1 for pressing the plate spring 12c on an inner bottom surface of the case C; a body 12e-2 extending from one side of the head 12e-1 and passing through the plate spring 12c and the case C; a rivet portion 12e-3 expanded while a tip end of the body 12e-2 is riveted, for pressing a pressing force on an outer bottom surface of the case C; and a through-hole 12e-4 vertically provided at a center thereof from the head 12e-1 along the body 12e-2, for providing a path along which the fixing unit 16 passes.

The coil 12d is a circular coil fixedly bonded to a cover C' of the case C, and a terminal device to which an electrical signal is applied may be guided to the outside of the case C to be electrically connected to an external signal source through a terminal.

The sound processing unit 12 is merely an embodiment, and may be a multi-functional sound processing unit for generating sounds and vibrations at the same time. In this case, a coil may be fixed to a diaphragm (vibration plate) such that the weight body 12a and the magnet stack body 12b vibrate due to the weights thereof and plate vibrations of the diaphragm and the coil are generated at the same time. That is, sounds and vibrations may be generated at the same time or according to a frequency band and an intensity of an AC signal.

Meanwhile, the fixing unit 16 according to the present invention may be a bolt or a screw screw-coupled to the image output unit 11 while passing through a central portion of the case C. In this case, the central portion of the case C through which the fixing unit 16 passes may be directly a central portion of the case C, may be a central portion of the rivet pin 12e for fixing the rivet to the case while passing through the plate spring 12c, and may be a central portion of the cover C'.

The fixing unit 16 may be inserted through the through-hole C" provided at the center of the cover C' to provide a path along which the fixing unit 16 is introduced into the case C.

Meanwhile, according to the present invention, a rotation preventing member 17 may be a fixing body provided on a lower surface of the case C that is to be fixed while surface-contacting the image output unit 11, for preventing rotation of the sound processing unit 12. Then, the fixed body may be a double-sided tape, or may be a double-sided tape having a resilient force (cushion body).

If an alternating electrical signal (frequency signal) is input to the coil 12d of the sound processing unit 12, the sound processing unit 12 reacts with a magnetic flux formed in the aperture between the magnet stack bodies 12b to generate sounds and vibrations while the weight body 12a and the magnet stack bodies 12b resiliently supported by the plate spring 12c vibrates due to the Fleming's left hand rule.

The sound processing unit 12 according to the present invention is mounted to an interior of a main apparatus, for example, a smart phone to output sounds and vibrations while the weight body 12a and the magnet stack bodies 12b vibrate according to an electrical signal input to the coil 12d, in which case the weight body 12a and the magnet stack bodes 12b are heavier than a diaphragm (vibration plate) formed of a general thin plate while being accompanied by a strong motion during vibrations. As described above, since the fixing structure may be damaged by the strong motion, a structure for consistently maintaining the firm fixing state is required.

In this aspect, the rotation preventing member 17, that is, the double-sided tape provided on a lower surface of the case C fixes the sound processing unit 12 to the image output unit 11 and the fixing unit 16 inserted through the through-hole C" formed in the cover C' passes through the lower surface of the case C or the rivet pin 12e to fix the sound processing unit 12 to the image output unit 11.

The fixing structure according to the present invention can improve a fixing force as compared with a fixing method by an adhesive, and can exclude a fixing structure having a separate thickness or area. That is, according to the present invention, since the image output unit 11 is fixedly pressed through the fixing unit 16 provided in the case C of the sound processing unit, the sound processing unit can be fixed without securing a thickness or area and accordingly, the image output unit can be installed in a minimum space of the main apparatus to which the sound processing unit is applied.

Figure 19:
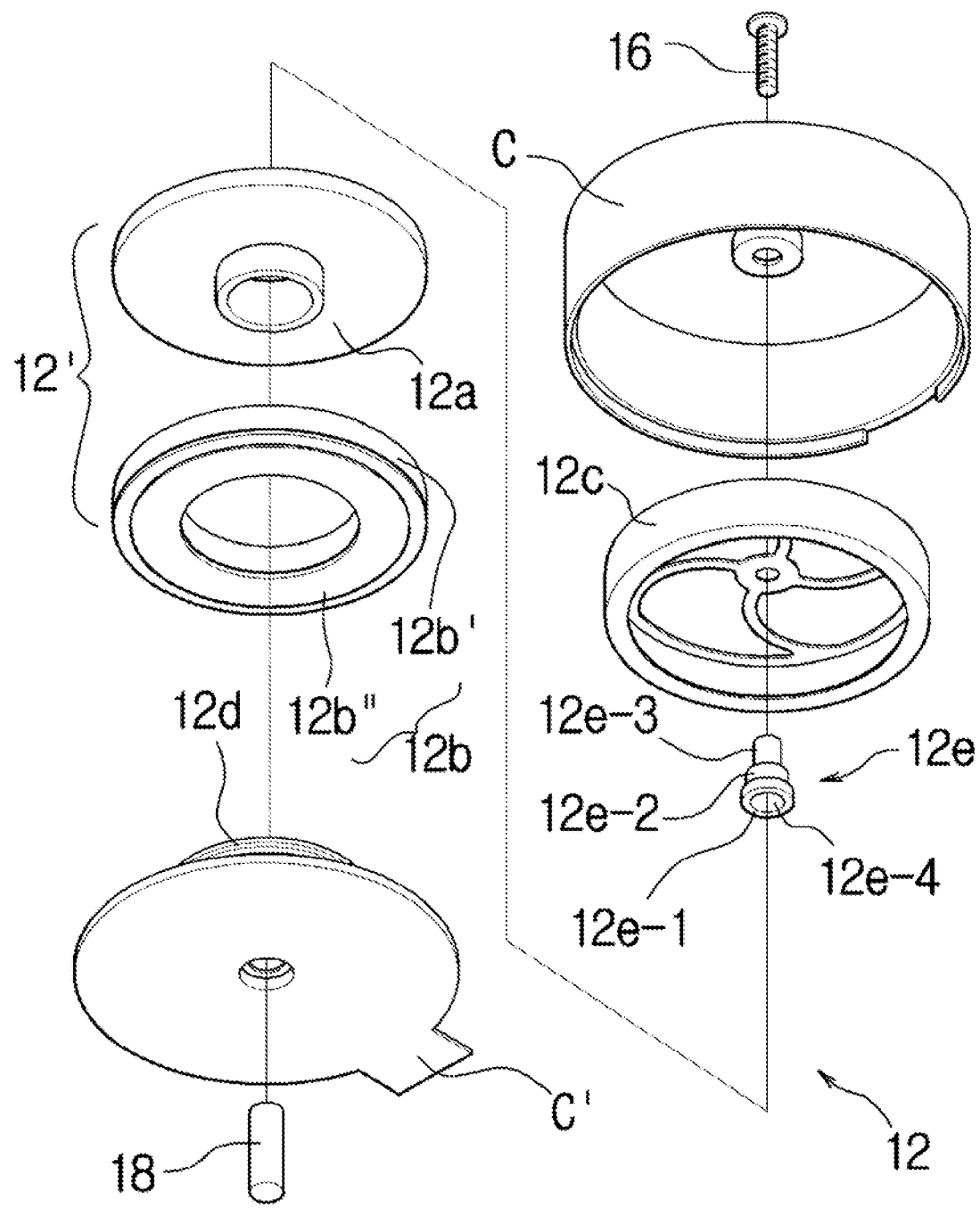
FIGS. 19 and 20 are exploded perspective views showing another embodiment of the sound processing unit according to the present invention.
Figure 20:
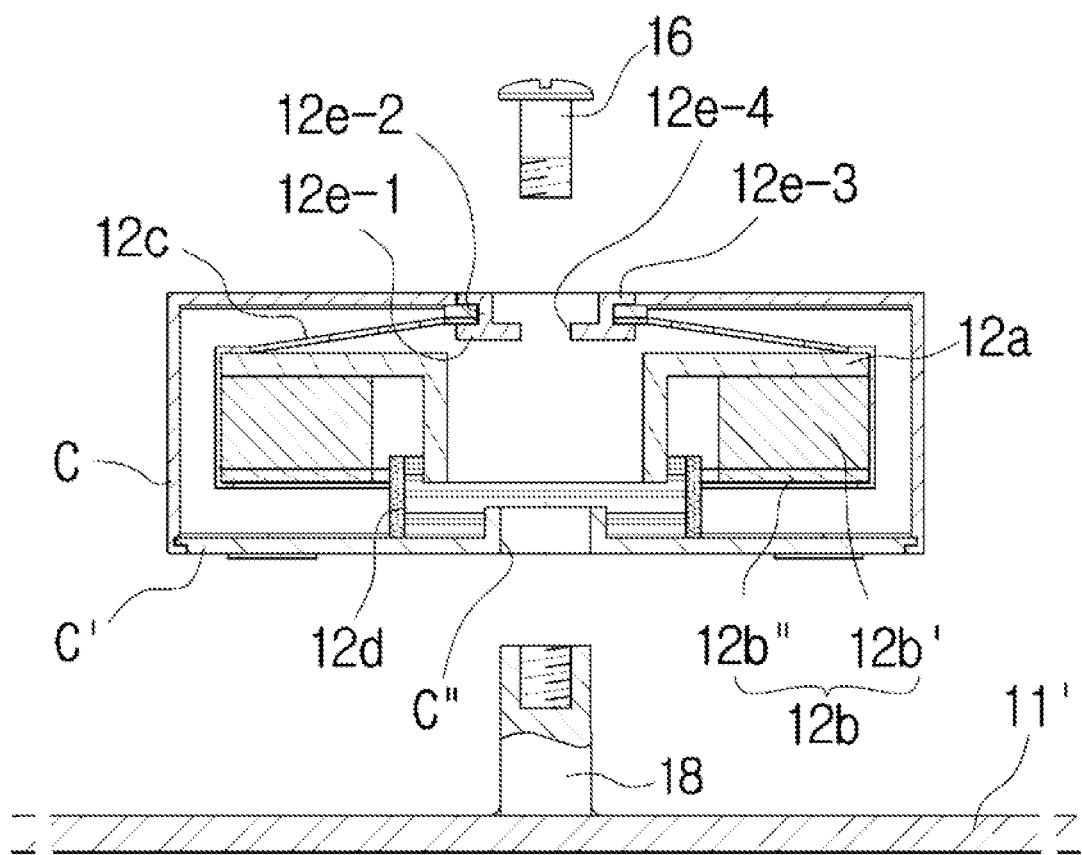
Figure 21:
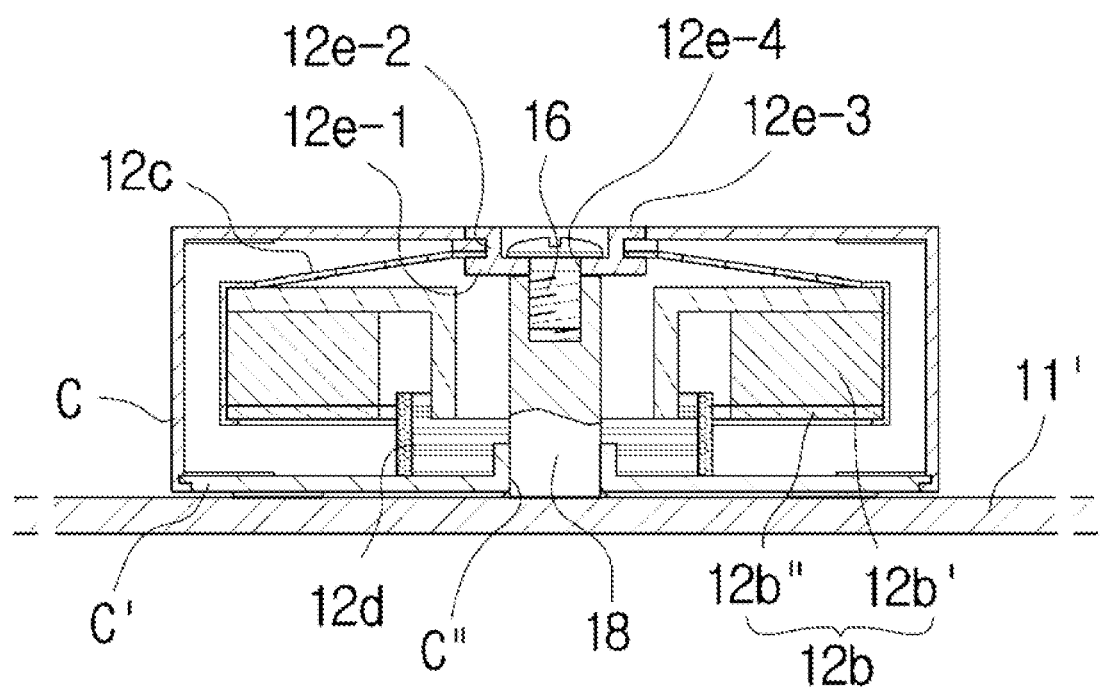
FIGS. 21 and 24 are a sectional views showing another embodiment of the sound processing unit according to the present invention.

Another embodiment of the sound processing unit 12 according to the present invention will be described as follows. First, as shown in FIGS. 19 to 21, a base fixing unit 18 one end of which is fixed to a fixed object 11' and an opposite end of which passes through and inserted into one surface of the sound processing unit 12 for converting an electrical signal into sounds or vibration signals or converting a collected sound wavelength into an electrical signal is provided, and a fixing unit 16 for attaching and fixing the sound processing unit 12 to the fixed object 11' while passing through an opposite surface of the sound processing unit 12 to be coupled to the base fixing unit 18 is provided.

Here, according to the present invention, the fixed object 11' may be a panel including a monitor for outputting an image signal or an image output unit such as a panel, for example, a touch panel including an LCD panel (including the part described in the former embodiment of the present invention).

Meanwhile, the sound processing unit 12 according to the present invention may react with an alternating electrical signal applied to the coil to generate sounds or vibrating forces while the magnetic circuit 12' including a magnet vibrates.

The sound processing unit 12 may include a yoke 12a corresponding to a circular block having a perforated center portion and annularly protruding to one side; a magnet stack body 12b provided to have an aperture (separation) between the magnet stack body 12b and the annular protrusion of the yoke 12a and corresponding to a rim type for forming a magnetic flux; a plate spring 12c fixed to the case C by the rivet pin 12e to resiliently support the inner bottom surface of the case C while the yoke 12a and the magnet stack body 12b are constrained; and a coil 12d one end of which is fixed to the cover C' of the case C having a box shape one side of which is opened and an opposite end of which is located in the aperture, for providing a flow path of an alternating electrical signal input from an external signal source to generate vibrations through a reaction with the magnetic flux in the aperture such that the yoke 12a and the magnetic stack body 12b react with each other to vibrate.

The magnetic circuit 12' may be a combination of the yoke 12a and the magnet stack body 12b.

Meanwhile, the fixing unit 16 according to the present invention may be a bolt or a screw passing through a central, portion of the case C and screw-coupled to the image output unit 11. In this case, the central portion of the case C through which the fixing unit 16 passes may be directly a central portion of the case C, may be a central portion of the case C in a state in which the rivet pin 12e for riveting the case C while passing through the plate spring 12c, or may be a central portion of the cover C'. In the present invention, an embodiment in which the rivet pin 12e passes through the plate spring 12c will be described.

The fixing unit 16 may be inserted through the through-hole C" provided at a center of the cover C' to provide a path along which the fixing unit is introduced into the case C.

Meanwhile, the base fixing unit 18 according to the present invention is a boss, and is fixed to the fixed object 11' through laser welding and is screw-coupled to the fixing unit 16 through a screw recess formed at a center of a fixing end thereof.

If an alternating electrical signal (frequency signal) is input to the coil 12d, the sound processing unit 12 according to the present invention reacts with a magnetic flux formed in the aperture between the magnet stack body 12b and the yoke 12e and the magnet stack body 12b resiliently supported by the plate spring 12c vibrate by Fleming's left hand rule to generate sounds and vibrations.

The sound processing unit 12 according to the present invention is mounted to a mobile device, for example a smart phone, to output sounds and vibrations while the yoke 12a and the magnet stack body 12b vibrate according to an electrical signal input to the coil 12d, in which case the yoke 12a and the magnet stack bodes 12b are accompanied by a strong motion during vibrations thereof. As described above, since the fixing structure may be damaged by the strong motion, a structure for consistently maintaining the firm fixing state is required.

That is, according to the present invention, since the image output unit 11' is fixedly pressed through the fixing unit 16 and the base fixing unit 18 provided in the case C of the sound processing unit, the sound processing unit 12 can be fixed without securing a thickness or area and accordingly, the output unit can be installed in a minimum space of the mobile device that is the fixed object 11' to which the sound processing unit 12 is applied.

Figure 22:
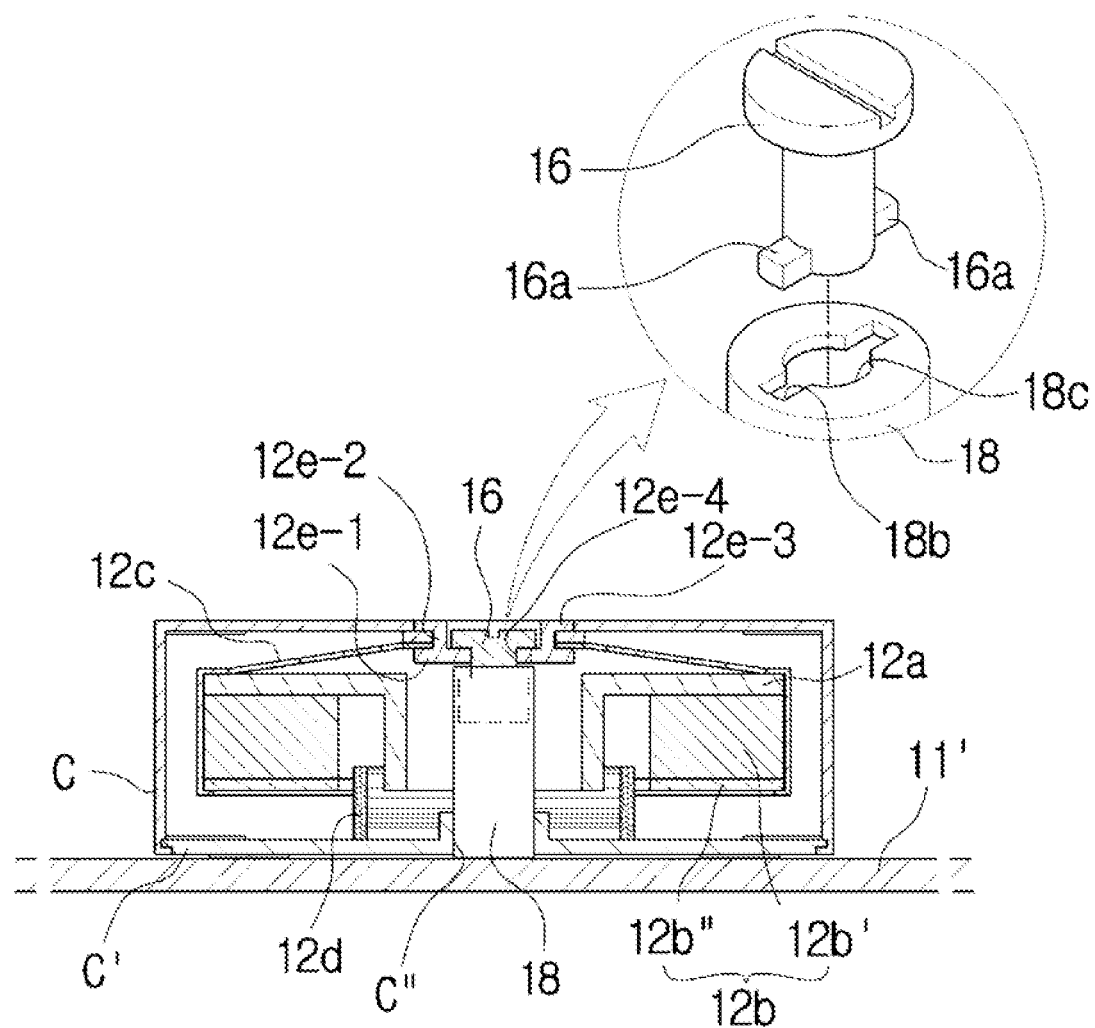

As shown in FIG. 22, in another embodiment of the present invention, catching bosses 16a are provided at an opposite sides of an outer surface of an end thereof opposite to the head portion of the fixing unit 16, and the catching bosses 16a are inserted into a fixing recess 18c provided at a tip end of the base fixing unit 18 and having a slit 18b and is rotated by 90 degrees to be fixed while crossing from the slit 18b.

Then, an adhesive may be applied to a head portion of the fixing unit 16 and the rivet pin 12e to prevent rotation thereof.

Figure 23:
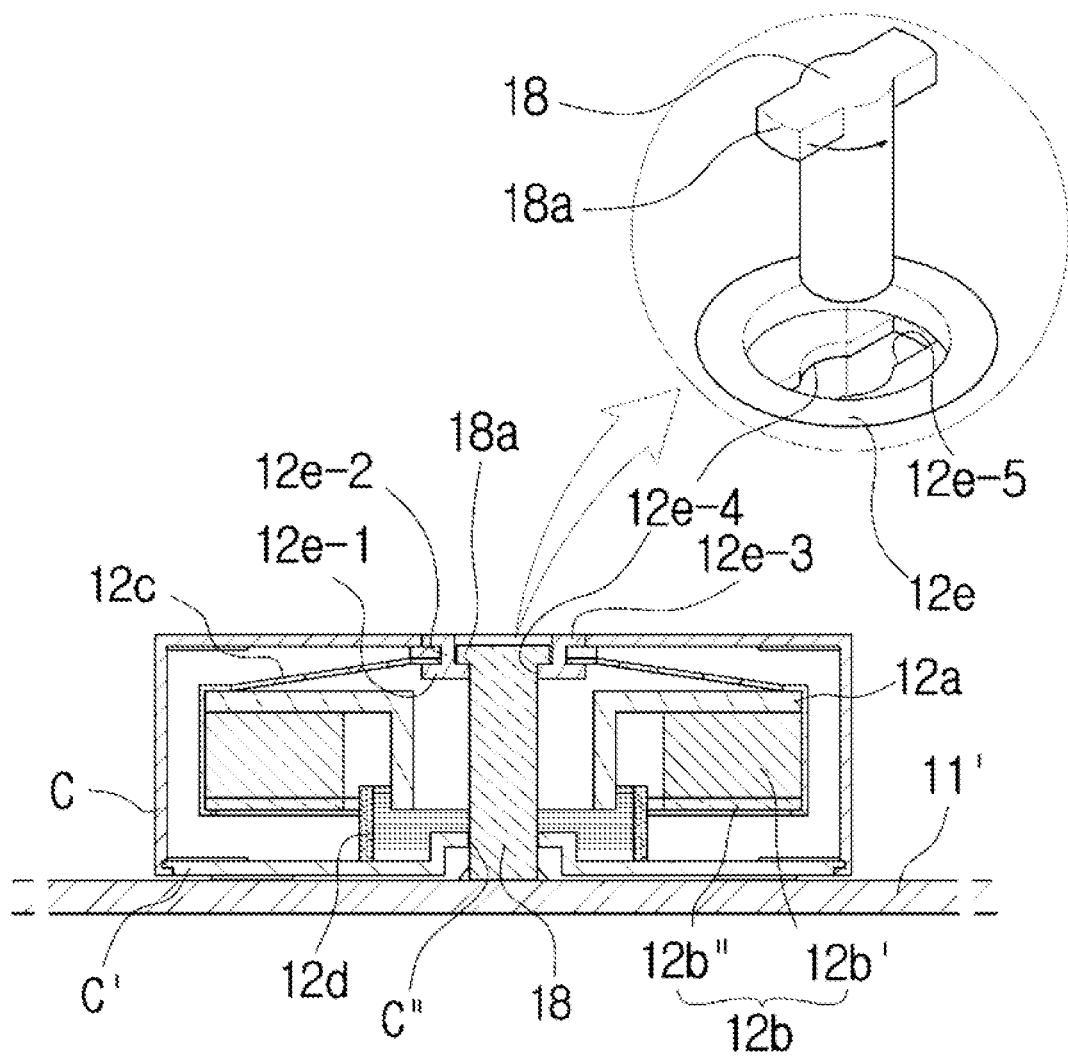

As shown in FIG. 23, in another embodiment of the present invention, one end of the base fixing unit 18 is fixed to one surface of the fixed object 11' and catching bosses 18a are provided at opposite sides of an outer surface of an opposite tip end of the base fixing unit 18, and slits 12e-5 into which the catching bosses 18a are inserted are provided at a perforated central portion of the cover C' and at an edge of the through-hole 12e-4 of the rivet pin 12e such that the catching bosses 18a of the base fixing unit 18 pass through the slits 12e-5 to be fixed while crossing from the slits 12e-5.

Then, as the catching bosses 18a of the base fixing unit 18 and the slit 12e-5 cross each other, an adhesive may be applied to the fixed portion to firmly fix the fixed portion.

Figure 24:
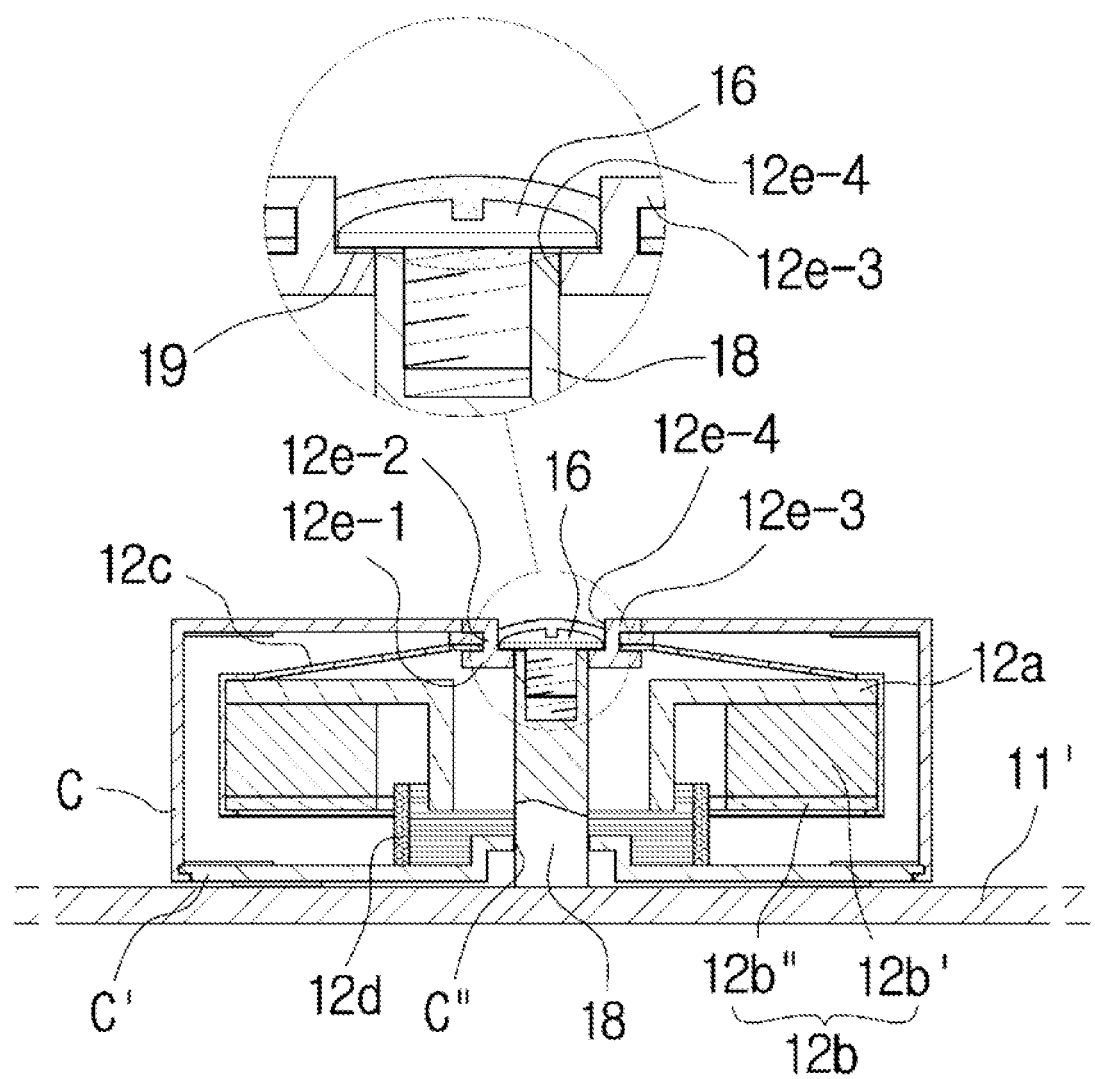

Meanwhile, according to the present invention, as shown in FIG. 24, one end of the base fixing unit 18 is fixed to one surface of the fixed object 11' and an opposite tip end thereof passes through the through-hole 12e-4 of the rivet pin 12e to be fixed through screw-coupling with the fixing unit 16 or coupling of the catching bosses 16a. A resilient member 19 for preventing the fixing unit 16 and the rivet pin 12e from being separated due to a tolerance during the fixing thereof may be provided at a portion where the rivet pin 12e contacts the fixing unit 16.

Then, the resilient member 19 may be a silicon ring body, but material that has a resiliency to provide an absorbing force while the shape thereof being deformed is satisfactory.

After the coupling, an adhesive may be applied to a portion where the rivet pin 12e, the fixing member 16, and the base fixing unit 18 are coupled to each other to firmly maintain a fixing force.

DESCRIPTION OF REFERENCE NUMERALS

10: Mobile device
11: Image output unit
12: Sound processing unit
12A: Weight body vibrating part
12B: Vibration body vibrating part
121: Yoke
122: Magnet
123: Top plate
124: Vibration plate
125: Coil
126: Plate spring
127: Rivet pin
127A: Rivet pin body
127B: Stopper
127C: Rivet boss
13: Fixing member
14: Resilient body
15: Molding member
12a: Weight body
12b: Magnet stack body
12b': Magnet
12b": Top plate
12c: Plate spring
12d: Coil
12e: Rivet pin
12e-1: Head
12e-2: Body
12e-3: Rivet portion
12e-4: Through-hole
12e-5: Slit
16: Fixing unit
17: Rotation stopper
18: Boss
C: Case (Sound processing unit)
C': Cover (Sound processing unit)
C": Through-hole
1: Body (Mobile device)

The invention claimed is:

1. A sound output mechanism for a mobile device, the sound output mechanism comprising:
an image output unit (11) disposed on a front surface of a body (1) of the mobile device (10) to display an image; and
a sound processing unit (12) disposed on the front surface of the body (1) of the mobile device (10) and acoustically connected to the image output unit (11), the sound processing unit (12) comprising:
a weight body vibrating part (12A), disposed in an interior of the body (1), to generate a first vibration having a first frequency band, and
a vibration plate vibrating part (12B), disposed in an interior of the body (1), to simultaneously vibrate with the weight body vibrating part (12A), the vibration plate vibrating part (12B) to generate at least one of a second vibration having a second frequency band lower than the first frequency band or a third vibration having a third frequency band higher than the first frequency band,
wherein the first vibration and at least one of the second vibration or the third vibration are communicated to the image output unit (11) to generate a sound that is outputted to a user.

2. The sound output mechanism of claim 1, wherein the image output unit (11) is an organic light emitting diode (OLED) panel, and
wherein a periphery of the image output unit (11) is surrounded by a resilient body (14) and is fixed to a peripheral portion of a front surface of the body (1) of the mobile device (10), and
wherein the resilient body (14) and a periphery of the body (1) are covered by a molding member (15).

3. The sound output mechanism of claim 1, wherein the sound processing unit (12) includes:
a yoke (121);
a magnet (122) and a top plate (123) positioned on the yoke (121) and having a ring shape;
a coil (125) fixed to one surface of a vibration plate (124), the coil (125) and the vibration plate (124) being fixed to an opened end of a case (C) and located in apertures at peripheral portions of the magnet (122) and the top plate (123);
a plate spring (126) fixed to an inner bottom surface of the case (C) by a rivet pin (127), for resiliently supporting the yoke (121), the magnet (122), and the top plate (123); and
a fixing unit (16) passing through the rivet pin (127) to attach the sound processing unit (12) to the image output unit (11).

4. The sound output mechanism of claim 3, wherein the rivet pin (127) includes:
a rivet pin body (127A) having a hollow cylindrical shape;
a stopper (127B) formed at one end of the rivet pin body (127A) to have a diameter larger than that of the rivet pin body (127A); and
a rivet boss (127C) formed at an opposite end of the rivet pin body (127A) to have a diameter smaller than that of the rivet pin body (127A).

5. The sound output mechanism of claim 3, wherein a screw that is the fixing unit (16) is a screw and is inserted into a central portion of the rivet pin (127) to be screw-coupled to the image output unit (11).

6. The sound output mechanism of claim 4, wherein a boss (18) is fixed to an inner surface of the image output unit (11) and the fixing unit (16) passing through the rivet pin (127) of the sound processing unit (12) is coupled to the boss (18) to fixedly press the image output unit (11) and the sound processing unit (12).

7. The sound output mechanism of claim 1, wherein: the weight body vibrating part (12A) includes an annular weight body (12a) having a perforated center portion and a magnet stack body (12b) having concentrically arranged magnets (12b') arranged to form an aperture for generating a magnetic flux, provided on an upper surface of the annular weight body (12a); and wherein
the vibration plate vibrating part (12B) including a coil (12d) connected to a cover (C') of a case (C) of the sound processing unit (12) and located in the aperture to provide an alternating electrical signal input from an external signal source to generate vibrations in response to the magnetic flux in the aperture;
the sound processing unit further comprising:
a plate spring (12c) to contain the weight body vibrating part (12A), the plate spring (12c) being resiliently attached to an the inner bottom surface of the case (C) of the sound processing unit (12) by a rivet pin (12e).

8. The sound output mechanism of claim 7, wherein the rivet pin (12e) includes:
a head (12e-1) for pressing the plate spring (12c) on the inner bottom surface of the case (C);
a body (12e-2) extending from one side of the head (12e-1) and passing through the plate spring (12c) and the case (C);
a rivet portion (12e-3) to generate a pressing force on an outer bottom surface of the case (C); and
a through-hole (12e-4) provided through a longitudinal axis of the rivet pin (12e) to provide a path for a fixing unit (16) to connect the sound processing unit (12) to the image output unit (11).

9. The sound output mechanism of claim 8, wherein the fixing unit (16) is a bolt or a screw and couples the sound processing unit (12) to the image output unit (11), wherein the fixing unit (16) passes through a central portion of the case (C), a central portion of the rivet pin (12e), and a central portion of the cover (C').

10. A sound processing unit fixing structure comprising:
a base fixing unit (18) having one end attached to a fixed object (11') and an opposite end inserted into one side of a sound processing unit (12), wherein the sound processing unit (12) is to convert an electrical signal into a sound or a vibration signal or convert a sound wavelength collected by the fixed object (11') into an electrical signal,
a fixing unit (16) inserted through another side of the sound processing unit (12) to connect to the base unit (18) to attach the sound processing unit (12) to the fixed object (11'); and
a rivet pin (12e) connected to a case (C) of the sound processing unit (12), the rivet pin (12e) being configured to receive the base fixing unit (18) and the fixing unit (16), wherein an adhesive is applied to a portion of the rivet pin (12e), a portion of the fixing member (16), and a portion of the base fixing unit (18) that are coupled to each other.

11. The sound processing unit fixing structure of claim 10, wherein the sound processing unit (12) includes:
a yoke (12a) including a circular block having a perforated center portion and an annular portion protruding from on side and surrounding the perforated center portion;
a magnet stack body (12b), in contact with the yoke (12a), having an aperture with a diameter greater than a diameter of the annular portion to provide an aperture between the magnet stack body (12b) and the annular portion of the yoke (12a) for forming a magnetic flux;
a plate spring (12c) to contain the yoke (12a) and the magnet stack body (12b), the plate spring (12c) being resiliently attached to an inner bottom surface of the case (C) by the rivet pin (12e); and
a coil (12d) having one end connected to a cover (C') of the case (C) and another end located in the aperture, the coil (12d) to provide an alternating electrical signal input from an external signal source to generate vibrations in the yoke (12a) and the magnetic stack body (12b) based on the magnetic flux in the aperture.

12. The sound processing unit fixing structure of claim 10, wherein the base fixing unit (18) is a boss and is attached to the fixed object (11') through laser welding and is screw-coupled to the fixing unit (16) through a screw recess formed at a center of a fixing end of the base fixing unit (18).

13. The sound processing unit fixing structure of claim 10, wherein the fixing unit (16) further comprises:
a first end having a head and a second end opposite the first end; and
catching bosses (16a) attached to the fixing unit (16) at the second end, and
wherein the base fixing unit (18) further comprises:
a fixing recess (18c) and a slit (18b), provided at a tip end of the base fixing unit (18), for rotatably receiving the catch bosses (16a).

14. The sound processing unit fixing structure of claim 10, further comprising:
a resilient member (19) provided at a portion where the rivet pin (12e) contacts the fixing unit (16) for preventing the fixing unit (16) and the rivet pin (12e) from being separated due to a tolerance during the fixing thereof.

15. The sound processing unit fixing structure of claim 10, wherein the resilient member (19) is a silicon ring body.

16. A sound processing unit fixing structure comprising:
a base fixing unit (18) having one end attached to a fixed object (11') and an opposite end, having oppositely arranged catch bosses (18a), inserted into one side of a sound processing unit (12), wherein the sound processing unit (12) is to convert an electrical signal into a sound or a vibration signal or convert a e sound wavelength collected by the fixed object (11') into an electrical signal; and a rivet pin (12*e*) connected to a case (C) of the sound processing unit (12), the rivet pin (12*e*) having a thoughhole (12*e*-4) and a slit (12*e*-5) having a shape corresponding to a shape of the catch bosses (18*a*) to rotatably receive the base fixing unit (18), wherein an adhesive is applied to a portion of the rivet pin (12*e*) and a portion of the base fixing unit (18) that are coupled to each other.

* * * * *